US011824872B1

(12) United States Patent
Meyer et al.

(10) Patent No.: US 11,824,872 B1
(45) Date of Patent: Nov. 21, 2023

(54) METHOD AND APPARATUS FOR ANOMALY DETECTION FOR USER BEHAVIOR

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, San Antonio, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 534 days.

(21) Appl. No.: 16/886,838

(22) Filed: May 29, 2020

Related U.S. Application Data

(60) Provisional application No. 62/855,097, filed on May 31, 2019.

(51) Int. Cl.
*H04L 9/40* (2022.01)
*G06F 21/62* (2013.01)
(Continued)

(52) U.S. Cl.
CPC ...... *H04L 63/1416* (2013.01); *G06F 21/6245* (2013.01); *G06N 5/04* (2013.01);
(Continued)

(58) Field of Classification Search
CPC ...... G06N 20/00; G06N 5/04; G06F 21/6245; G06Q 30/0185; G06Q 40/02;
(Continued)

(56) References Cited

U.S. PATENT DOCUMENTS

2006/0236083 A1\* 10/2006 Fritsch ............... H04W 8/22
713/1
2012/0292388 A1\* 11/2012 Hernandez ......... G06Q 20/3223
235/379
(Continued)

*Primary Examiner* — Mohammad A. Nilforoush
*Assistant Examiner* — Wodajo Getachew
(74) *Attorney, Agent, or Firm* — Plumsea Law Group, LLC

(57) ABSTRACT

A system and method for detecting an anomaly based on user interaction with a mobile computing device is disclosed. The method includes activating, on the mobile computing device, an application, which is configured to store the machine learning model and the behavioral profile generated by the machine learning model in the memory of the mobile computing device; receive, track, and store in the memory of the mobile computing device an input pattern including navigation information and identification information inputted from the user during the user interaction with the mobile computing device; detect anomaly based on the user interaction with the mobile computing device by comparing the stored behavioral profile with the stored input pattern; and prohibit user to have further access to the financial application including user accounts in response to detection of the anomaly.

20 Claims, 19 Drawing Sheets

(51) Int. Cl.
  *G06N 5/04*   (2023.01)
  *G06N 20/00*  (2019.01)
  *G06Q 50/26*  (2012.01)
  *G06Q 40/02*      (2023.01)
  *G06Q 30/018*     (2023.01)

(52) U.S. Cl.
  CPC ........... *G06N 20/00* (2019.01); *G06Q 50/265* (2013.01); *H04L 63/102* (2013.01); *H04L 63/1425* (2013.01); *G06Q 30/0185* (2013.01); *G06Q 40/02* (2013.01)

(58) Field of Classification Search
  CPC . G06Q 50/265; H04L 63/1425; H04L 63/102; H04L 63/1416
  USPC .................................................. 705/4; 726/4
  See application file for complete search history.

(56) References Cited

U.S. PATENT DOCUMENTS

| | | | |
|---|---|---|---|
| 2014/0237595 A1* | 8/2014 | Sridhara | G06F 21/566 709/224 |
| 2018/0219914 A1* | 8/2018 | Reith | H04W 12/088 |
| 2019/0020669 A1* | 1/2019 | Glatfelter | G06F 21/552 |
| 2021/0090750 A1* | 3/2021 | Sadilek | G16H 50/30 |

* cited by examiner

METHOD AND APPARATUS FOR ANOMALY DETECTION FOR USER BEHAVIOR

CROSS-REFERENCE TO RELATED APPLICATIONS

This application claims the benefit of Provisional Patent Application No. 62/855,097 filed May 31, 2019, and titled "Method and Apparatus for Anomaly Detection for User Behavior," which is incorporated by reference herein in its entirety.

TECHNICAL FIELD

The present disclosure generally relates to methods and systems for detecting anomalies in user behavior, and in particular for methods and systems for detecting anomalies in user behavior based on past user behavior of an application on a mobile computing device.

BACKGROUND

The use of applications on mobile computing devices which involve accessing sensitive user data continues to increase. Fraud prevention techniques including biometric identification, passwords, user names, and security keys are commonly used to provide identification information and are frequently required to access an application on a mobile computing device to prevent fraud and to allow a user to access sensitive user data. However, if identification information is stolen, preventing fraud by an unauthorized user of the mobile computing device becomes difficult.

There is a need in the art for a system and method that addresses the shortcomings discussed above.

SUMMARY

In one aspect, a method for performing machine learning in a computing device for a detection of an anomaly in a user interacting with the computing device, the method including storing a behavioral profile of the user of the computing device generated by a machine learning model in a memory of the computing device; and activating, on the computing device, a financial institution application which includes the machine learning model which is configured to: receive, track, and store in the memory of the computing device an input pattern including navigation information and identification information inputted from the user during the user interaction with the computing device; verify identification information of the user; detect anomaly of the user interacting with the computing device by comparing the stored behavioral profile with the stored input pattern; prohibit user to have further access to the financial application including user accounts in response to detection of the anomaly; and allow the user to have access to the financial application including user accounts in response to verification of identification information without any anomaly.

In another aspect, a method for detecting an anomaly based on user interaction with a mobile computing device through machine learning, the method including storing a behavioral profile of the user of the mobile computing device generated by a machine learning model in a memory of a cloud computing system; storing a financial application in a memory of the mobile computing device which is coupled to the cloud computing system; activating, on the mobile computing device, the financial application, which is configured to: receive the machine learning model and the behavioral profile generated by the machine learning model from the cloud computing system; store the machine learning model and the behavioral profile generated by the machine learning model in the memory of the mobile computing device; receive, track, and store in the memory of the mobile computing device an input pattern including navigation information and identification information inputted from the user during the user interaction with the mobile computing device; verify identification information of the user; detect anomaly based on the user interaction with the mobile computing device by comparing the stored behavioral profile with the stored input pattern; prohibit user to have further access to the financial application including user accounts in response to detection of the anomaly; and allow the user to have access to the financial application including user accounts in response to verification of identification information without any anomaly.

In another aspect, a system for detecting an anomaly based on user interaction with a mobile computing device through machine learning including at least one memory including instructions and at least one hardware processor to execute the instructions within the at least one memory to implement: storing a behavioral profile of the user of the mobile computing device generated by a machine learning model in the at least one memory of the mobile computing device; and activating, on the mobile computing device, a financial institution application which includes the machine learning model which is configured to: receive, track, and store in the at least one memory input pattern including navigation information and identification information inputted from the user during the user interaction with the mobile computing device; verify identification information of the user; detect anomaly of the user interacting with the mobile computing device by comparing the stored behavioral profile with the stored input pattern; prohibit user to have further access to the financial application including user accounts in response to detection of the anomaly; and allow the user to have access to the financial application including user accounts in response to verification of identification information without any anomaly.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
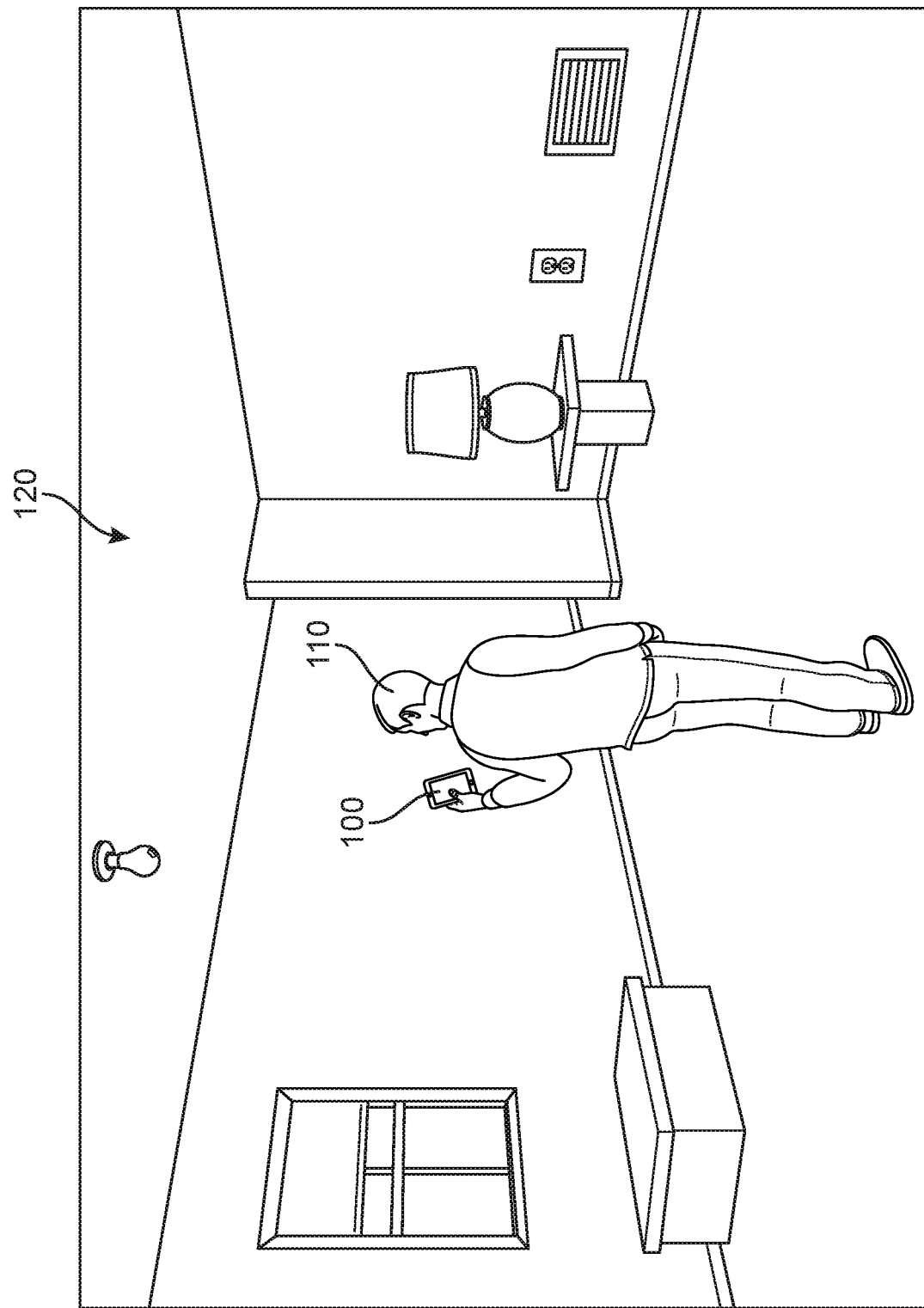
FIG. 1 is a view of a user accessing an application on a mobile computing device according to an embodiment.

Mobile computing devices are frequently used to store applications which access sensitive user data for the convenience of the user. Although users desire the convenience of easy access to their sensitive data, fraud prevention techniques using identification information such as biometric identification, passwords, user names, and security keys are commonly used to safeguard the sensitive data of the user. However, if identification information is obtained, unauthorized access of a sensitive data of a user may occur. In order to further safeguard the sensitive data of a user, the behavior of a user to obtain access to sensitive data may be tracked and recorded (stored). The behavior of a user may be referred to as a behavioral pattern. If an individual attempts to gain access to the sensitive data of a user by using an application on a mobile computing device in a manner which is inconsistent with the past behavior of the user, then an anomaly may be detected and an application such as a financial application may be suspended to prevent access or use of the sensitive data of the user. The presence of an anomaly may indicate that an unauthorized user is attempting to use a device or application. Also, the presence of an anomaly may indicate that some problem (such as a health problem) is causing a user to behave in an unusual manner.

Edge computing relates to distributing processing resources and data storage closer to where the data is created to avoid the long routes to a computer system such as a cloud computing system. One or more embodiments of the present application provide a local machine learning system including a local machine learning model and behavioral profile at a mobile computing device in order to reduce the traffic between a mobile computing device and a cloud computing system (decrease latency) and to take advantage of the processing resources of the mobile computing device to reduce the load of the cloud computing system. By moving a portion of the machine learning from the global machine learning system to the local machine learning system, this may reduce the traffic between the mobile computing device and the cloud computing system (decrease latency) and take advantage of the processing resources of the mobile computing device to reduce the load or the use of computing resources of the cloud computing system. Accordingly, the detection of an anomaly may be made through a local machine learning system at the mobile computing device 100 instead of through the global machine learning system in the cloud computing system.

In one or more embodiments, which will be described in more detail below by referring to the drawings, machine learning (training) may be performed in the mobile computing device. More specifically, a local machine learning system including a local machine learning model may be stored in a memory of the mobile computing device. Training data may be input to the mobile computing device in different ways such as through an image capture device or a user interface. Based on the training data, the local machine learning model may learn or be trained by way of the training data, and the local machine learning model can generate or update a behavioral profile stored in the memory of the mobile computing device for anomaly detection at the mobile computing device. Alternatively, training data inputted to the mobile computing device may be transmitted to a cloud computing system which may be applied to one or more machine learning models for training. In another alternative, some of the inputted training data may be used to further train the local machine learning model and other inputted training data may be forwarded from the mobile computing device to the cloud computing system and used for training one or more machine learning models in the cloud computing system. In another alternative, the inputted training data may be utilized for training machine learning models in both the mobile computing device and the cloud computing system.

FIG. 1 shows a user 110 holding a mobile computing device 100 in a room 120 of a home or office according to an embodiment. Although mobile computing device 100 is shown as a smartphone in FIG. 1, examples of mobile computing devices may include a smartphone, a tablet, a smartwatch, a smart glass, a smart helmet, and a laptop. Although embodiments refer to the use of mobile computing devices, any computing device could run software applications in embodiments of the present application. Examples of any computing device would also include a desktop computer and a terminal for a computer system in addition to the example of a mobile computing device.

Figure 2:
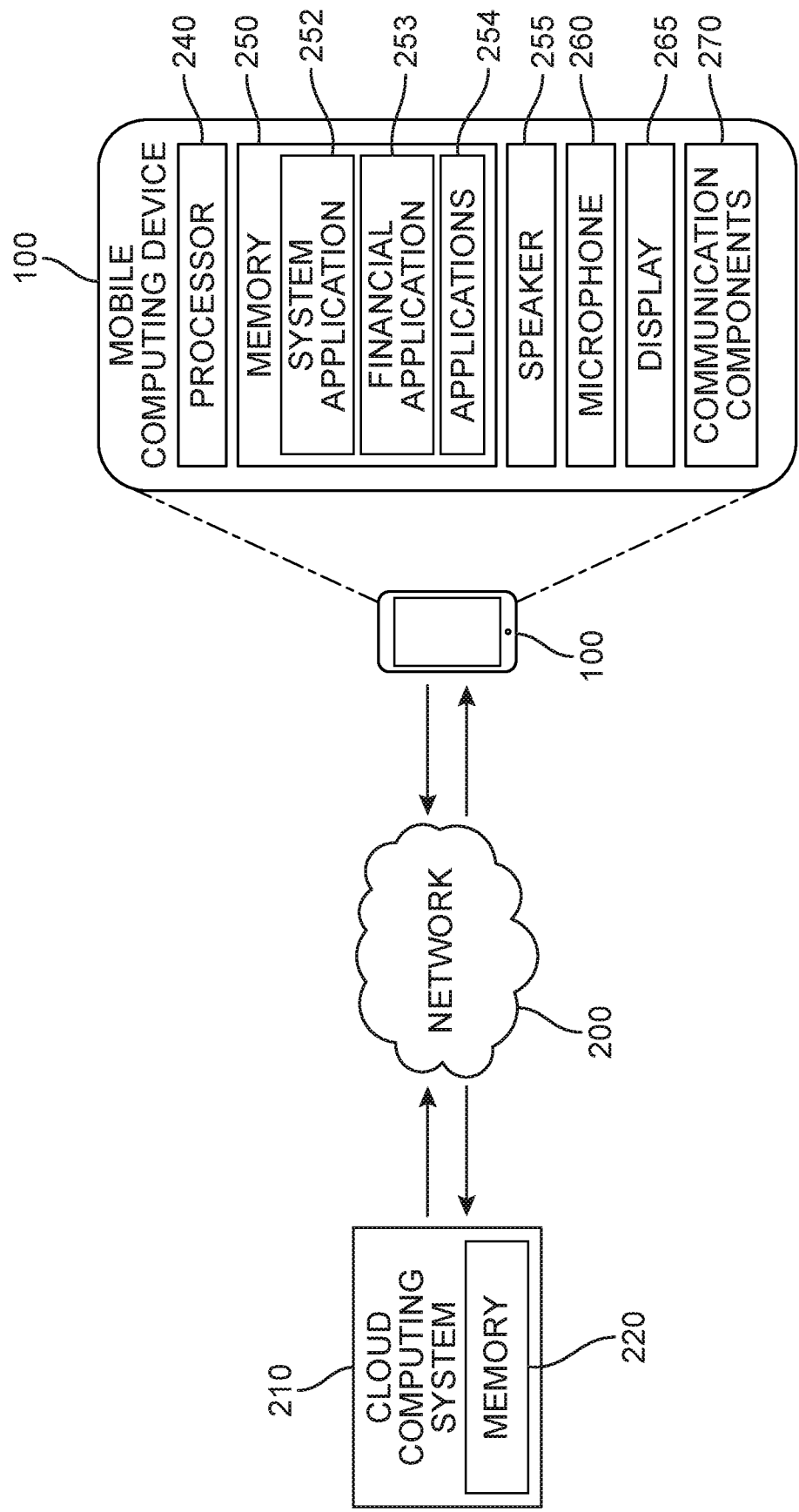
FIG. 2 is a schematic view of a network coupling a mobile computing device of FIG. 1 to a cloud computing system according to an embodiment.
Figure 11:
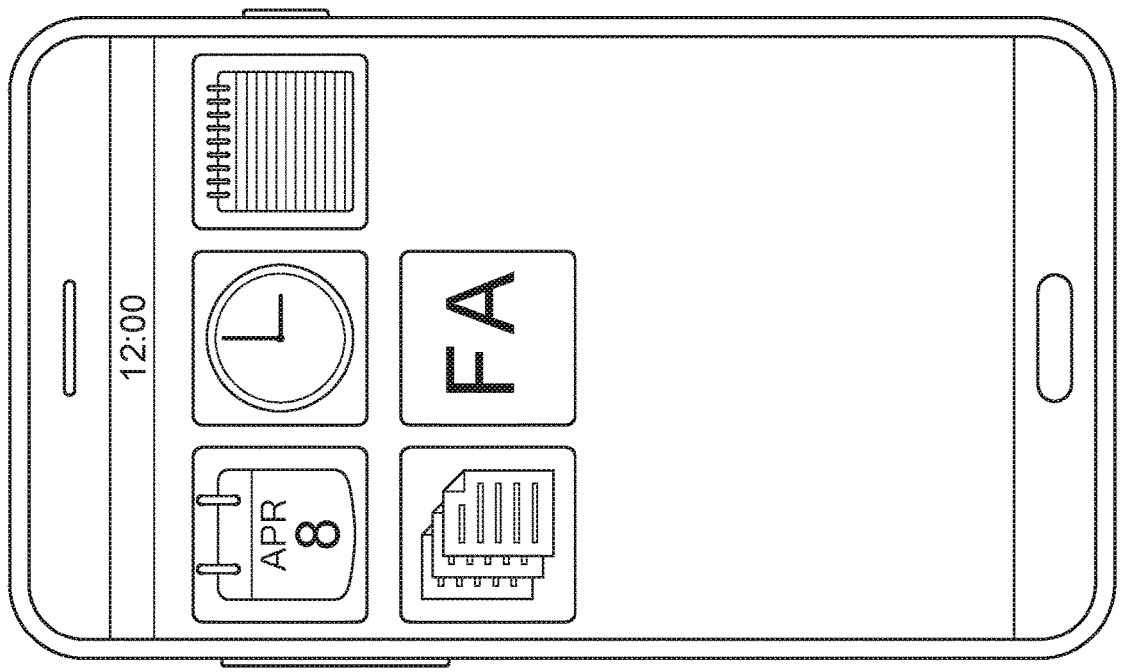

FIG. 2 is a schematic view of a mobile computing device 100 of FIG. 1 coupled to a network 200 and a cloud computing system 210 coupled to the network 200 according to an embodiment. A cloud computing system 210 may have a memory 220 storing a global machine learning system, which includes at least one global machine learning model. The cloud computing system 210 may also store one or more local machine learning systems in memory 220 which can be configured to be transmitted to a mobile computing device 100 through network 200. The global machine learning system and the one or more local machine learning systems stored in memory 220 may be used and managed by a financial institution. For example, the global machine learning system may be associated with one or more financial accounts of a user 110 including banking and/or insurance. However, these are only examples of potential machine learning systems. A local machine learning system may include a local machine learning model. In addition, a local machine learning system may include at least one local machine learning model. Further, although a financial institution may use and manage the cloud computing system, another organization specializing in providing cloud computing systems for customers such as financial institutions may manage the cloud computing system for the financial institution, FIG. 2 also shows the mobile computing device 100 of FIG. 1 in greater detail. The mobile computing device 100 includes a processor 240 and a memory 250. The memory 250 stores a system application 252 which may include an operating system. The memory 250 also stores a financial application 253 and one or more applications 254. The financial application 253 may also be referred to as a financial services application. These applications may be shown as icons as indicated in FIG. 11. The financial application 253 may be used to access financial information in a memory 220 of a cloud computing system 210 managed by a financial institution, and have access to a local machine learning system, which may include a local machine learning model. The financial application may also provide access to sensitive data such as personal data of the user 110, The user 110 may activate the financial application 253 using an icon displayed on the mobile computing device 100. However, machine learning application 254 is only one example of an application which can be stored in the memory 250 and which could be used in communication with machine learning systems in the cloud computing system 210 through network 200. One or more other applications 254 may also be accessed by the user 110 on the mobile computing device 100. An example of one or more applications 254 is a global positioning application which may provide the location of the mobile computing device 100. The mobile computing device 100 in FIG. 2 also includes a speaker 255 to output audio communication and a microphone 260 to receive audio communication so that a user 110 can communicate with applications 253 and 254, which may include one or more local machine learning systems. These applications 253 and 254 may communicate with a cloud computing system 210 through network 200. The mobile computing device 100 includes a display 265, which can display a user interface so that a user may communicate with applications such as financial application 253 and/or applications 254 or the cloud computing system 210 through network 200. The mobile computing device 100 also includes communication components 270 to communicate with the cloud computing system 210.

Figure 3:
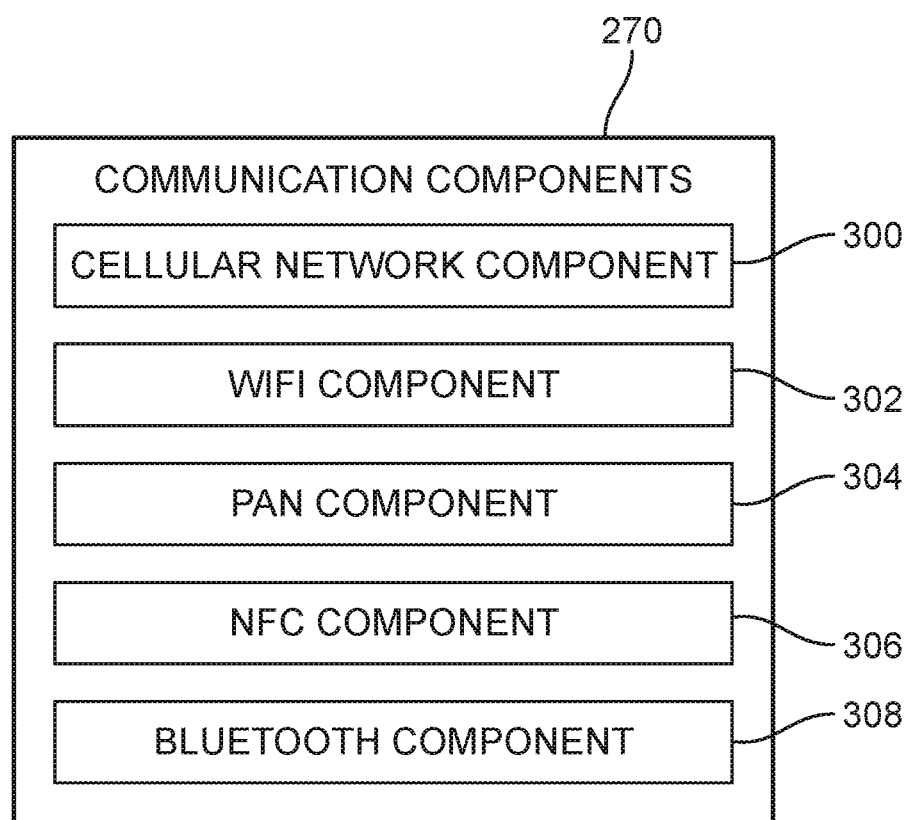
FIG. 3 is a schematic view of communication components of the mobile computing device of FIG. 2 according to an embodiment.

FIG. 3 is a schematic view of an example of communication components of the mobile computing device shown in FIGS. 1 and 2 in an embodiment. The communications components may include a cellular network component 300, a WIFI component 302, a personal area network (PAN) component 304, a near field communication (NFC) component 306, and a Bluetooth component 308. Any type of wireless or wired communication technology may be used to couple the mobile computing device 100 to the network 200 so that the mobile computing device 100 can communicate with the cloud computing system 210. One or more of these communication components 270 may be used to couple the mobile computing device 100 to the network 200.

Figure 4:
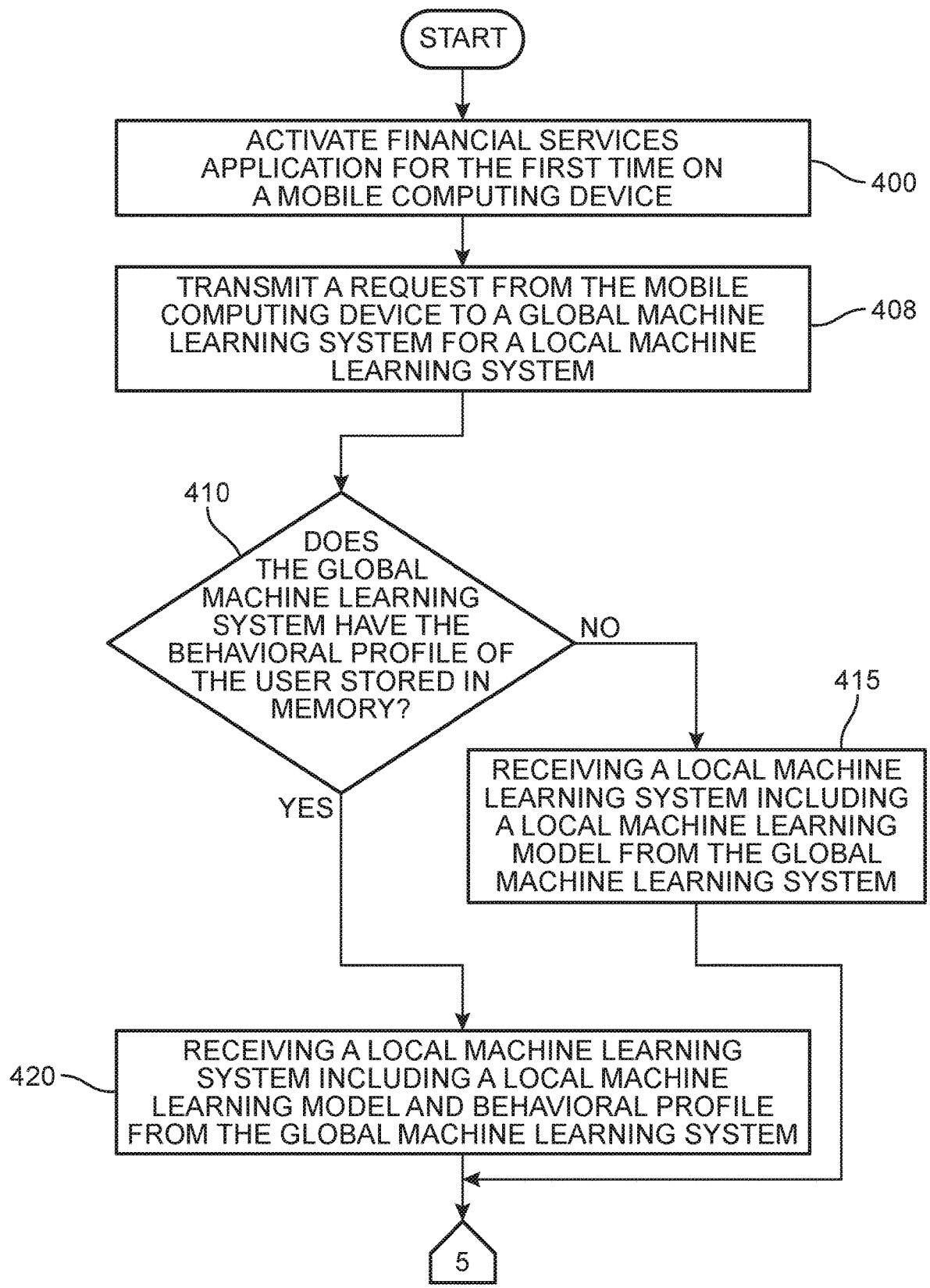
FIGS. 4 and 5 are flow charts illustrating a process for performing behavioral machine learning according to an embodiment.
Figure 5:
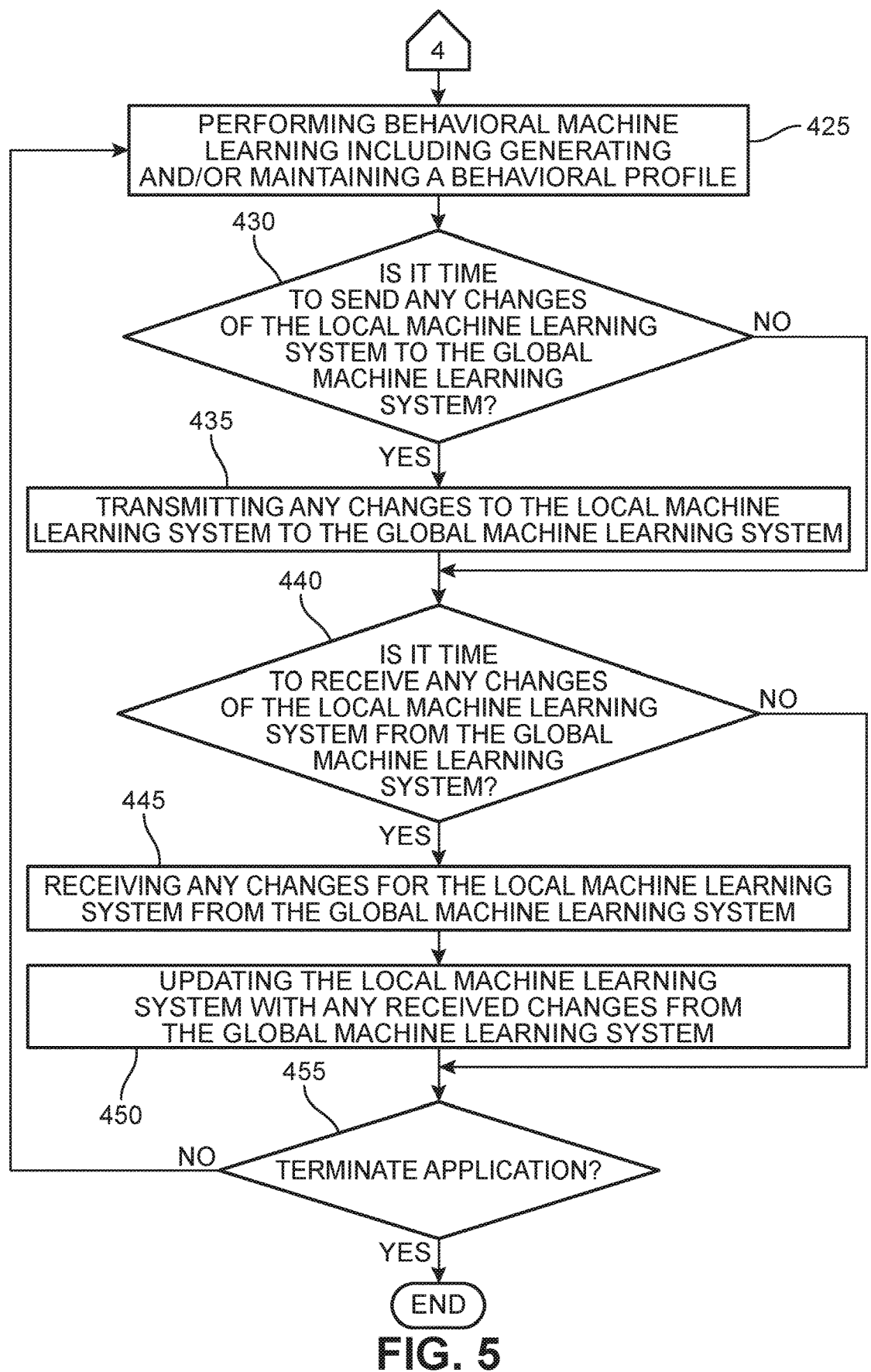

FIGS. 4 and 5 are flow charts illustrating a process for performing behavioral machine learning according to an embodiment. A financial services application may be provided on a mobile computing device 100. A copy of the financial services application may be found in memory 220 of cloud computing system 210 and a copy of the financial services application may have been previously downloaded from the cloud computing system 210 or sent by the cloud computing system 210 to the mobile computing device 100. A financial services application, which may also be referred to as a financial services application, may be denoted by an icon FA, which may appear on a mobile computing device 100.

Referring to FIG. 4, a financial services application may be activated (operation 400) by a user 110 touching a user interface on a display 265, which displays an icon for the financial application 253. For example, FIG. 11 is a schematic view of a mobile computing device 100 of FIGS. 1 and 2 which shows an icon denoted by FA for a financial application 253, which upon activation, communicates with system application 252 to establish a communication between a cloud computing system 210 and the mobile computing device 100 of FIGS. 1 and 2 according to an embodiment. The financial application 253 may cause the mobile computing device 100 to transmit a request for a local machine learning system from the mobile computing device 100 to the global machine learning system stored in a memory 220 of the cloud computing system 210 by way of a network 200 (operation 408). The local machine learning system may include a local machine learning model.

Referring to operation 410, the global machine learning system determines whether the global machine learning system has a behavioral profile of a user 110 of the mobile computing device 100. The behavioral profile of user 110 may be stored in memory 220 of the cloud computing system 210. If the global machine learning system does not have a behavioral profile of user 110, then the mobile computing device 100 receives a local machine learning system including a local machine learning model from the global machine learning system by way of network 200 from the cloud computing system 210 (operation 415). This local machine learning system including the local machine learning model may be trained as the user 110 utilizes the mobile computing device 100 and may produce through machine learning a behavioral profile of the user 110. If the global machine learning system has a behavioral profile of the user, then the mobile computing device 100 receives a local machine learning system including a local machine learning model and a behavioral profile from the global machine learning system (operation 420). The local machine system including the local machine learning model and behavioral profile may be accessed by the financial application 253 and/or may be included as part of the financial application 253.

Referring to FIG. 5, behavioral machine learning including generating and/or maintaining a behavioral profile of a user 110 may be performed (operation 425). The behavioral profile may be updated (maintained) through training (machine learning) by tracking and storing the behavior of the user 110 as the user interacts with the mobile computing device 100. Through this training, there may be changes to the local machine learning system including the local machine learning model due to changes in one or more model parameters, such as categories, labels, and weights. This is an example of machine learning including training (operation 425). The financial application executed on the mobile computing device 100 may determine whether it is time to send any changes of the local machine learning system including the local machine learning model to the global machine learning system, which also includes at least one global machine learning model (operation 430). As discussed above, these changes maybe in one or more of categories, labels, and weights. Accordingly, the mobile computing device 100 is not required to send the entire local machine learning system. Instead, only changes based on training of the local machine learning system including the local machine learning model are transmitted from the mobile computing device 100 to the global machine leaning system of the cloud computing system 210 through network 200.

Accordingly, if it is determined that it is time to send any changes of the local machine learning system including the local machine learning model, then any changes are transmitted from the mobile computing device 100 to the global machine learning system of the cloud computing system 210 (operation 435), and then the process proceeds to operation 440. If it is determined that it is not time to send any change of the local machine learning system to the global machine learning system, then the process moves from operation 430 to operation 440.

Referring to operation 440, the financial application executed on the mobile computing device 100 may determine whether it is time to receive any changes of the local machine learning system including the local machine learning model from the global machine learning system, which also includes at least one global machine learning model (operation 440). If it is not the time for the local machine learning system to receive changes from the global machine learning system, then the process moves to operation 455. However, if it is time for the local machine learning system to receive any changes from the global machine learning system, then the mobile computing device 100 receives any changes from the global machine learning system (operation 445) and updates the local machine learning system including the local machine learning model at the direction of the financial application 253 (operation 450).

As discussed above, the local machine system including the local machine learning model and behavioral profile may be accessed by the financial application 253 and/or may be included as part of the financial application 253. In addition, as discussed above, these changes maybe in one or more of categories, labels, and weights. Accordingly, the mobile computing device 100 is not required to receive the entire local machine learning model or local machine learning system. Instead, only changes based on training of the global machine learning system including the global machine learning model are transmitted from the cloud computing system 210 to the mobile computing device 100 through network 200 to update the local machine learning system including the local machine learning model stored in the mobile computing device 100. After the updating of the local machine learning system including the local machine learning model is completed (operation 450), the process moves to operation 455. If the user terminates the financial application, then the process ends until the user decides to active the financial application. If the user does not terminate the financial application, then the financial application continues to perform the behavioral machine learning including maintaining (updating) the behavioral profile of the user (operation 425).

Figure 12:
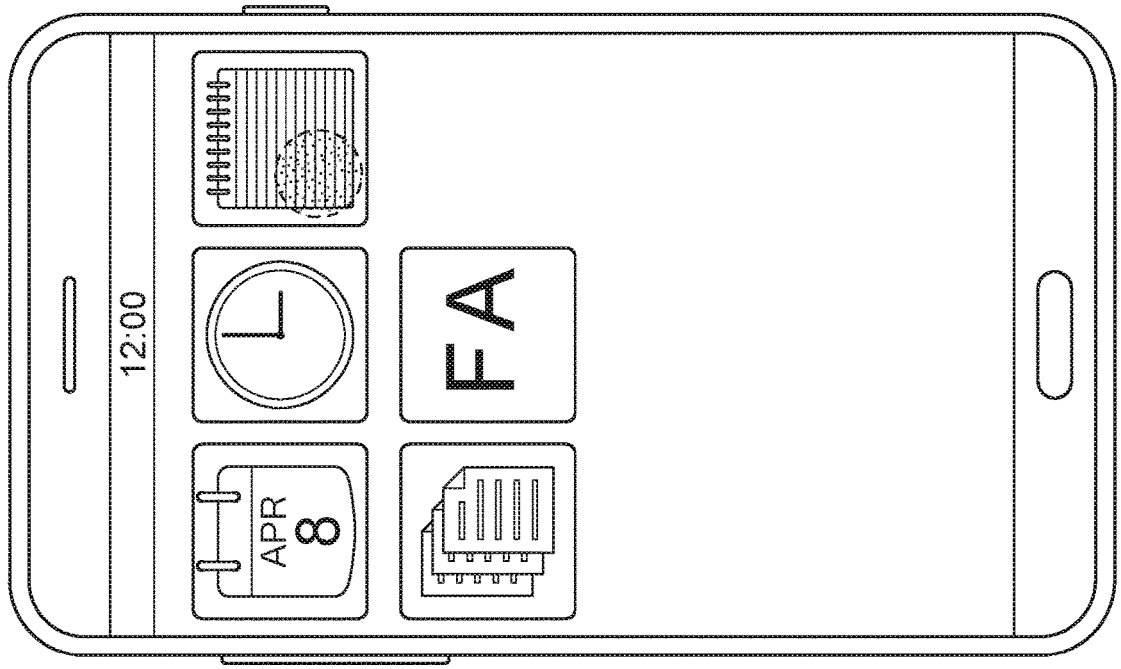
FIGS. 11 through 21 are schematic views of a mobile computing device which show a behavioral process of a user according to an embodiment.
Figure 14:
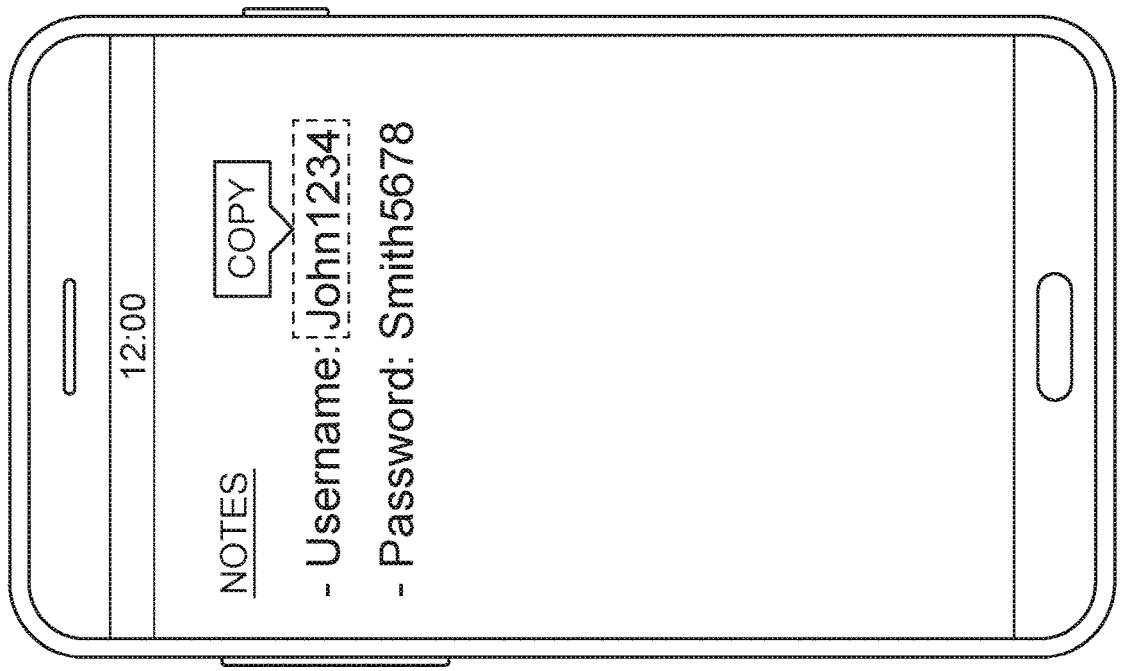
Figure 13:
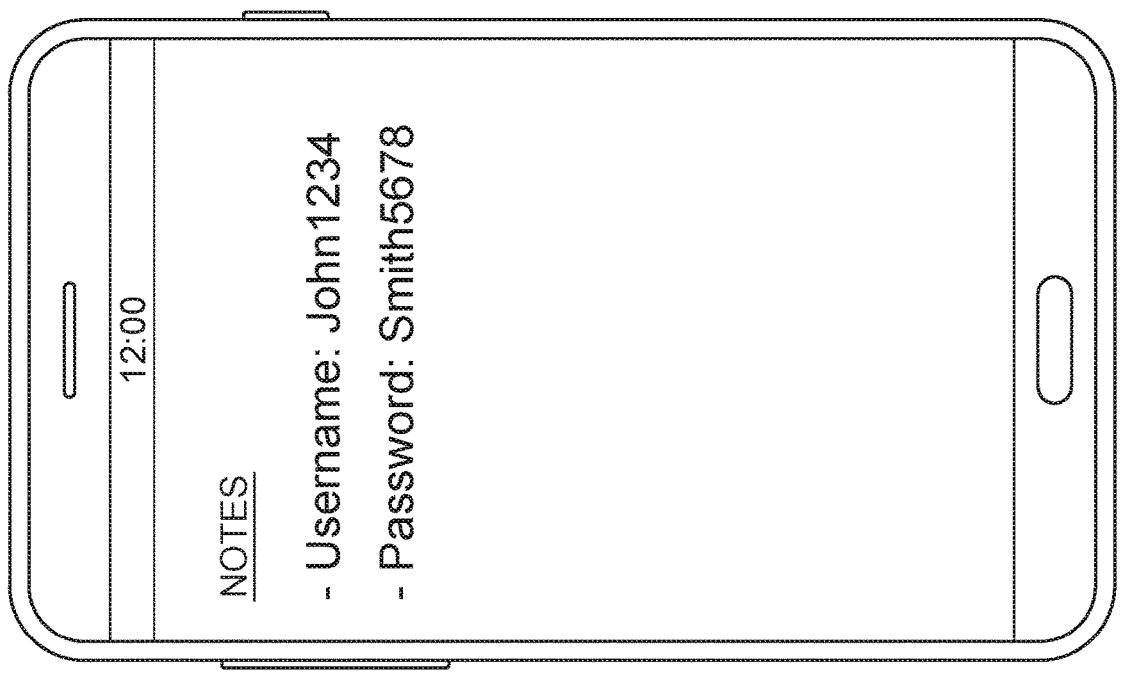
Figure 16:
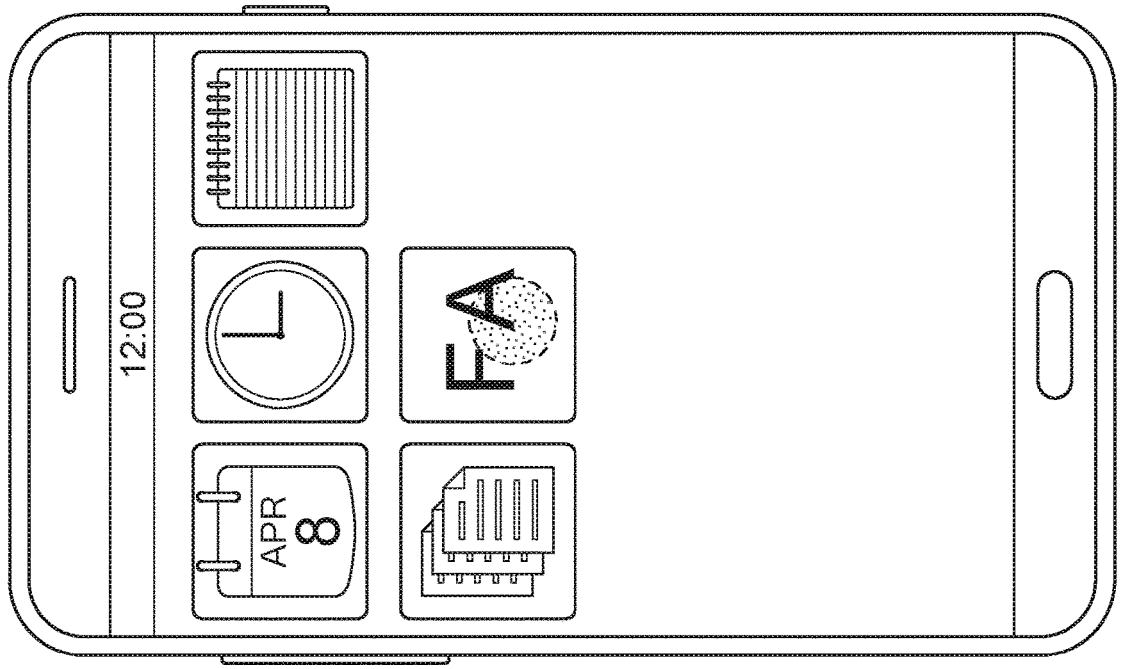
Figure 15:
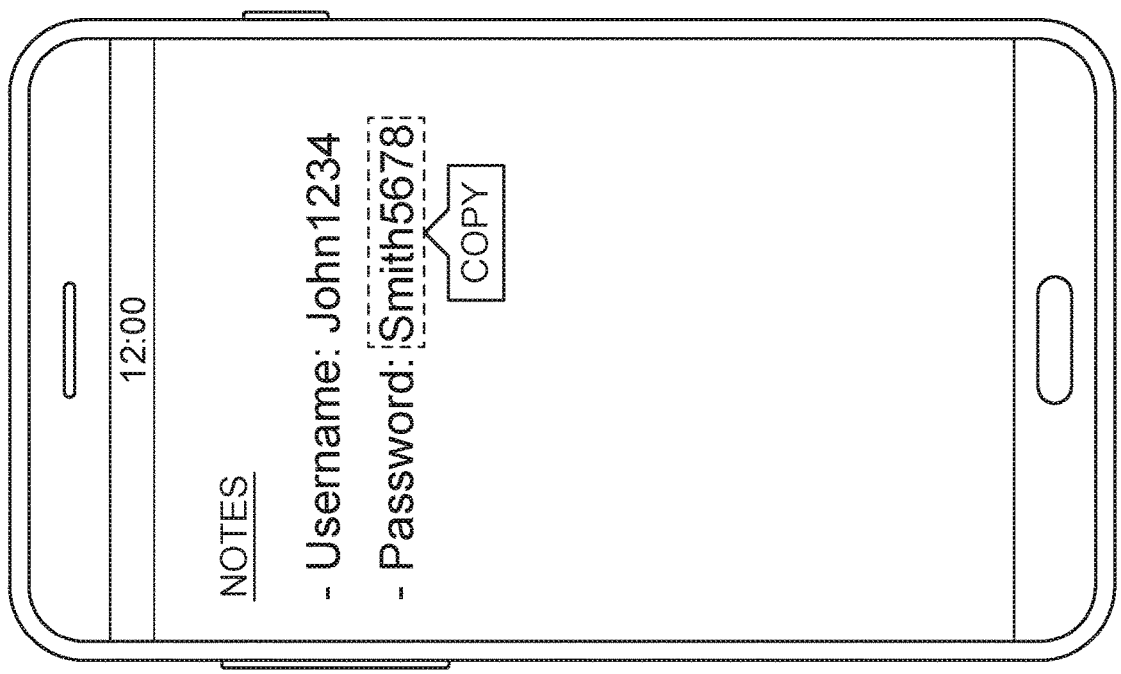
Figure 18:
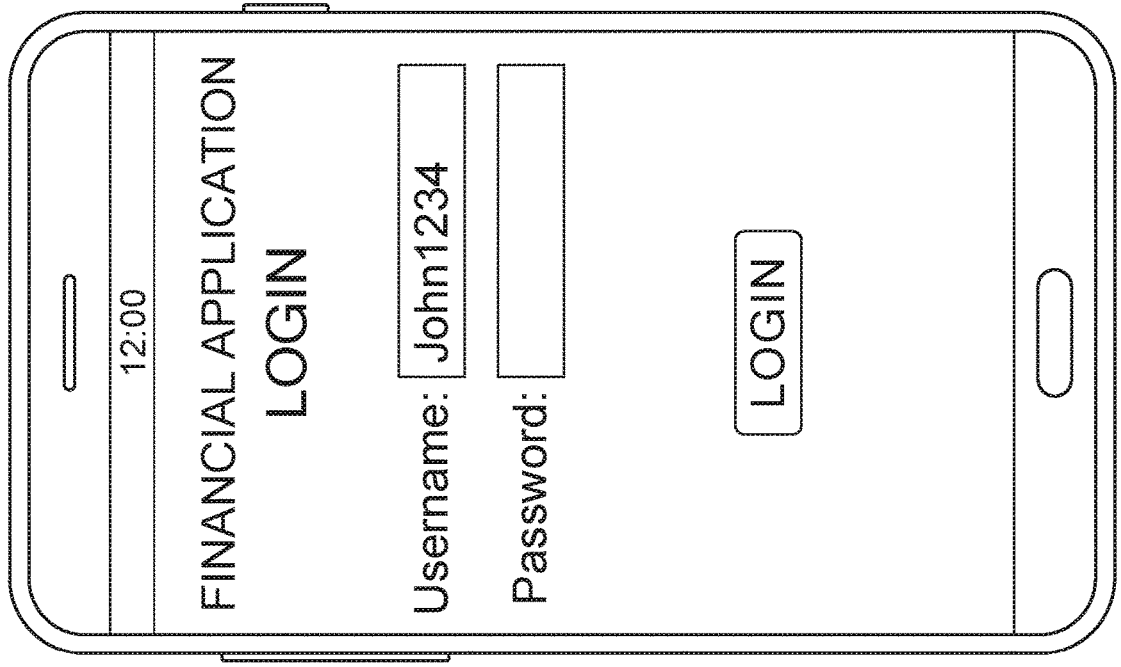
Figure 17:
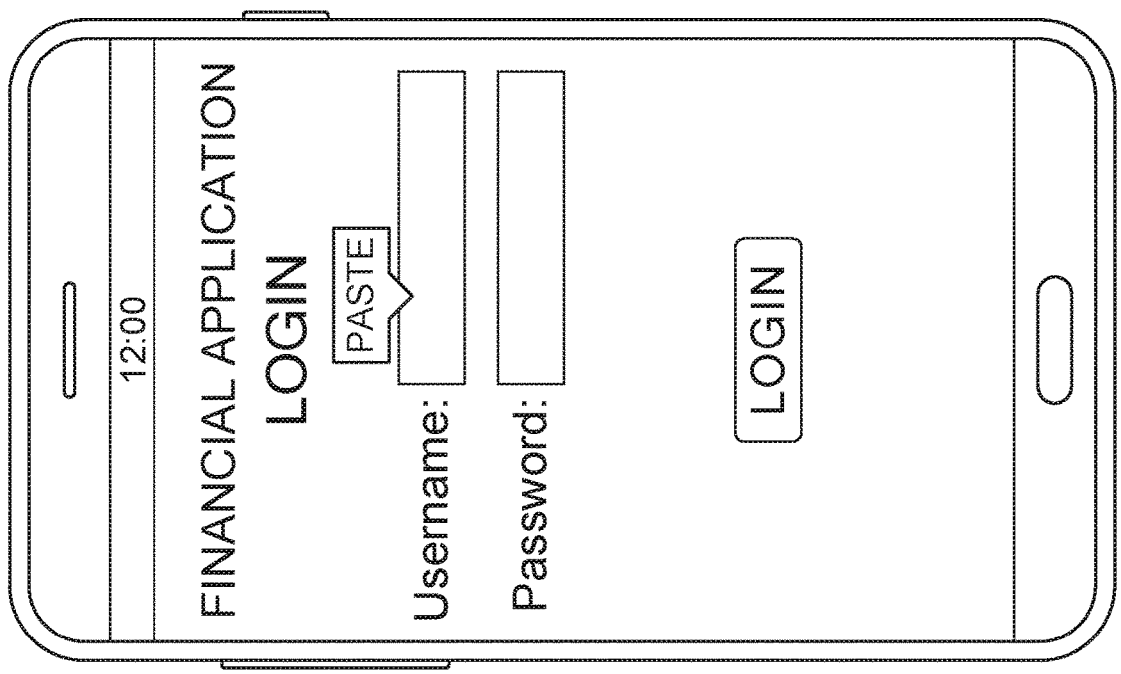
Figure 20:
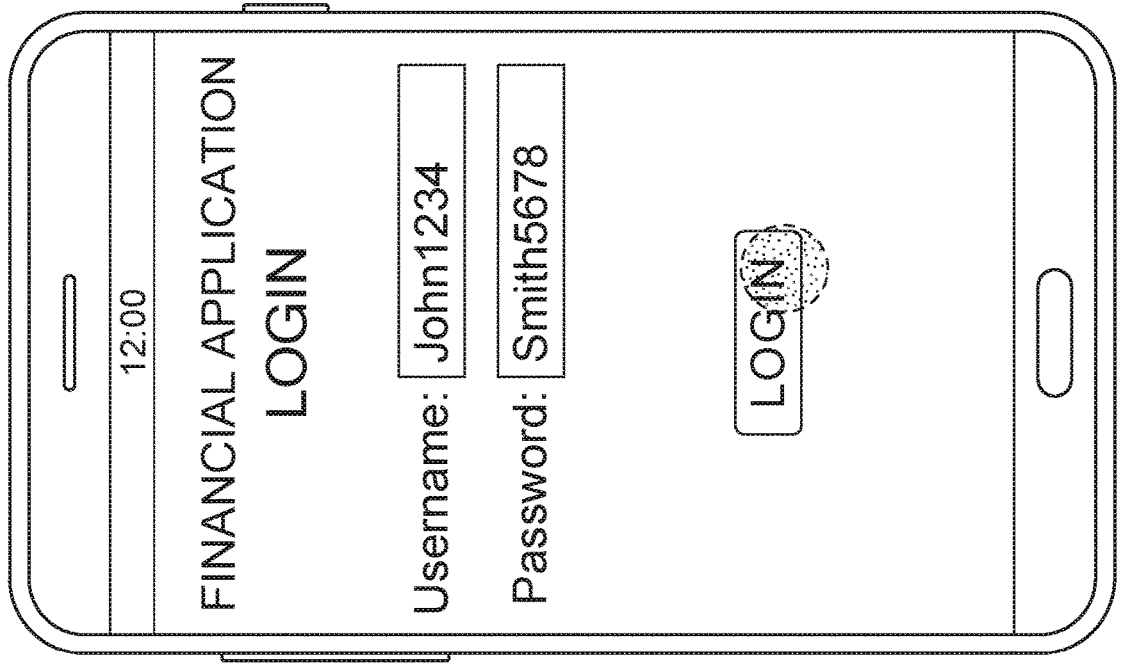
Figure 19:
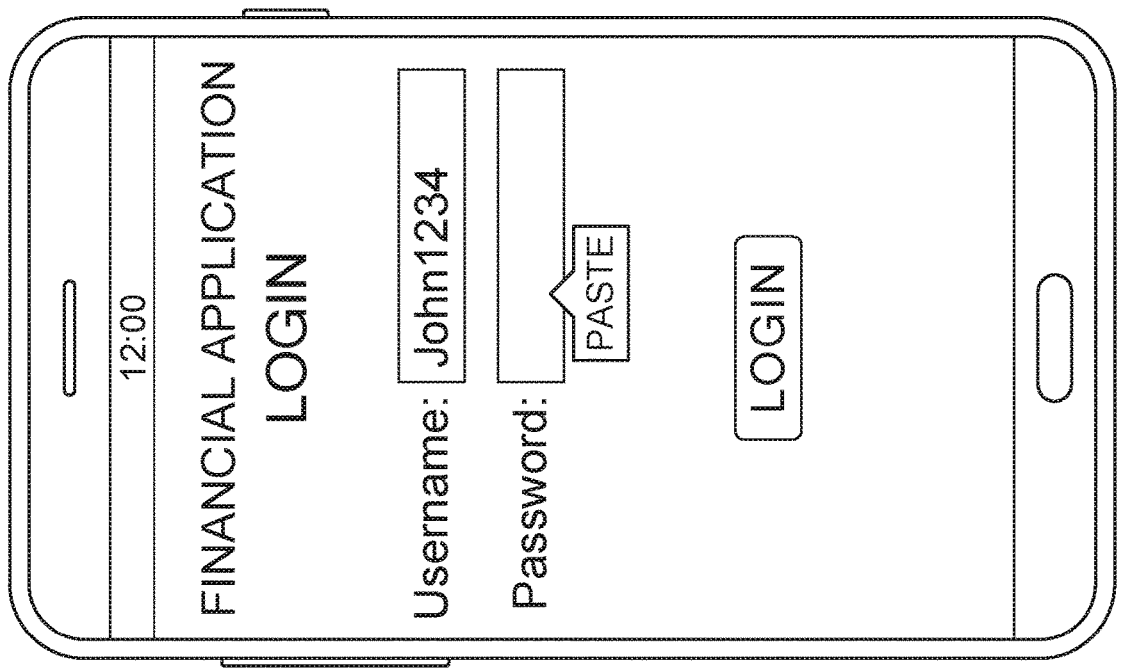
Figure 21:
Figure 23:
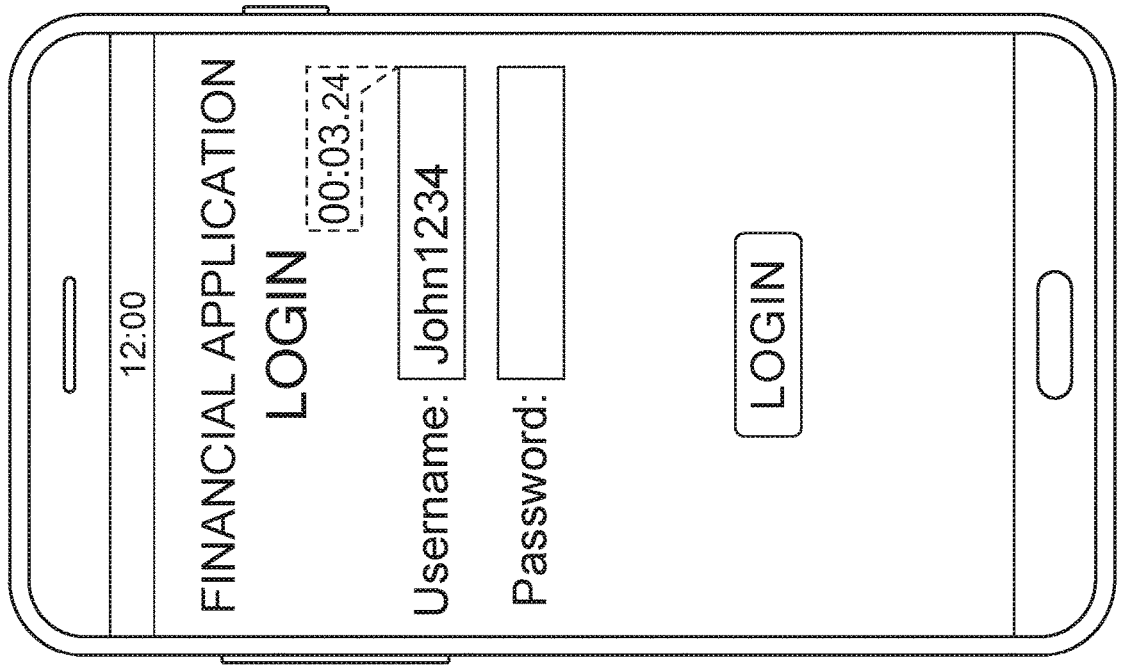
FIGS. 22 through 25 are schematic views of a mobile computing device which show a behavioral process according to an embodiment.
Figure 26:
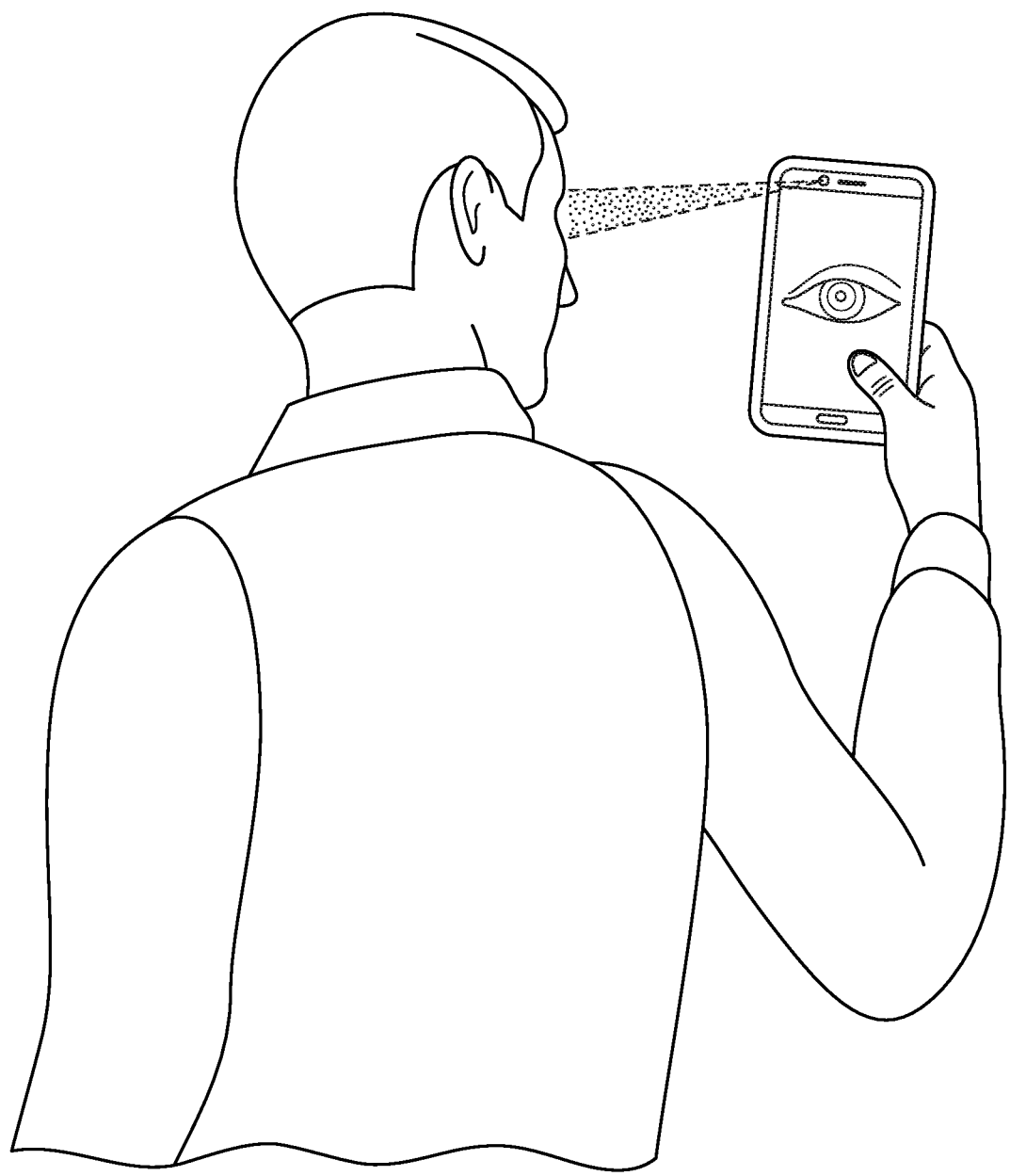
FIG. 26 is a schematic view of a user providing biometric information to a mobile computing device according to an embodiment.

FIGS. 11 through 21 are schematic views of a mobile computing device 100 which show a behavioral pattern (input pattern) of a user 110 according to an embodiment, which may be used to train a local machine learning model of a machine learning system to generate or maintain (update) a behavioral profile. Behavioral machine learning including generating and/or maintaining (updating) a behavioral profile as discussed above with respect to operation 425 may be performed by receiving, tracking, and storing in the memory of the mobile computing device 100 an input pattern including navigation information and identification information inputted from the user during the user interaction with the mobile computing device 100. The input pattern of user 110 may show a behavioral pattern which is used for generating a behavioral profile. For example, FIGS. 11 and 12 show icons which may represent applications including a clock, calendar, notepad, files, and a financial application, which are displayed on display 265 of mobile computing device 100. An example of an input pattern begins with FIG. 12. FIG. 12 shows a user touching an icon of a notepad application of a user interface displayed on display 265 of mobile computing device 100. Once the notepad application is activated, FIG. 13 shows a display of a user name "John1234" and password "Smith5678" for a financial application. FIG. 14 shows a user 110 copying the username. The next step in the process may be illustrated in FIG. 16 where the user 110 opens the financial application 253 by touching the icon FA of the user interface on the display 265 as shown in FIG. 16. Once the financial application is activated, the copied user name may now be pasted as shown in FIG. 17 and FIG. 18. The next step in the process may be for user 110 to move to the notes application as shown in FIG. 15 and copy the password. Once the password is copied, the user 110 may move back to the financial application so that the copied password may be pasted as shown in FIG. 19 and FIG. 20. A user 110 may then touch a login as shown in FIG. 20 to login into the financial application as shown in FIG. 20, and the financial application may approve of the submitted user name and password to grant access to accounts by way of the financial application 253 as shown in FIG. 21. Additional identification information such as biometric information may be requested by the financial application 253 before granting the user 110 access to sensitive data of the financial application 253. FIG. 26 shows an example of a user providing the biometric information to the mobile computing device 100 to use by the financial application 253. In this example, the biometric information is comprised of information from the user's retina, which can be scanned by the mobile computing device. In still other embodiments, other biometric markers could be used including heartbeat information, body temperature information, and movement (or gait) information. The local machine learning system including the local machine learning model may receive, track, and store in the memory 250 of the mobile computing device 100 the above input pattern including navigation information and identification information inputted from the user during the user interaction with the mobile computing device 100.

Figure 22:
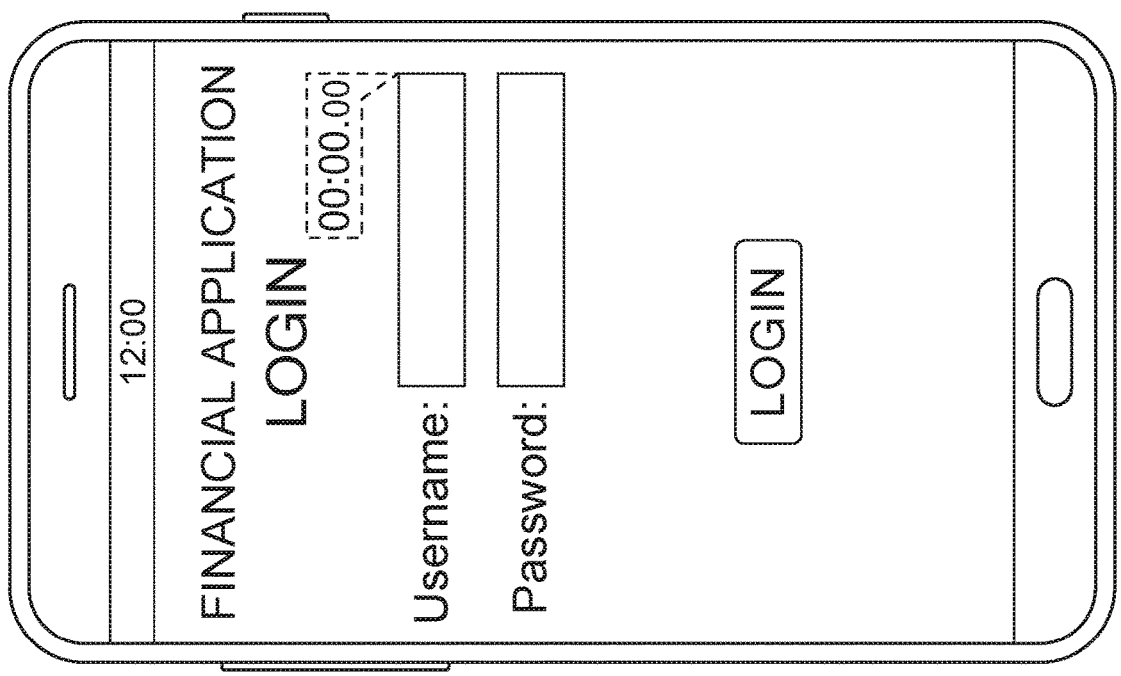
Figure 25:
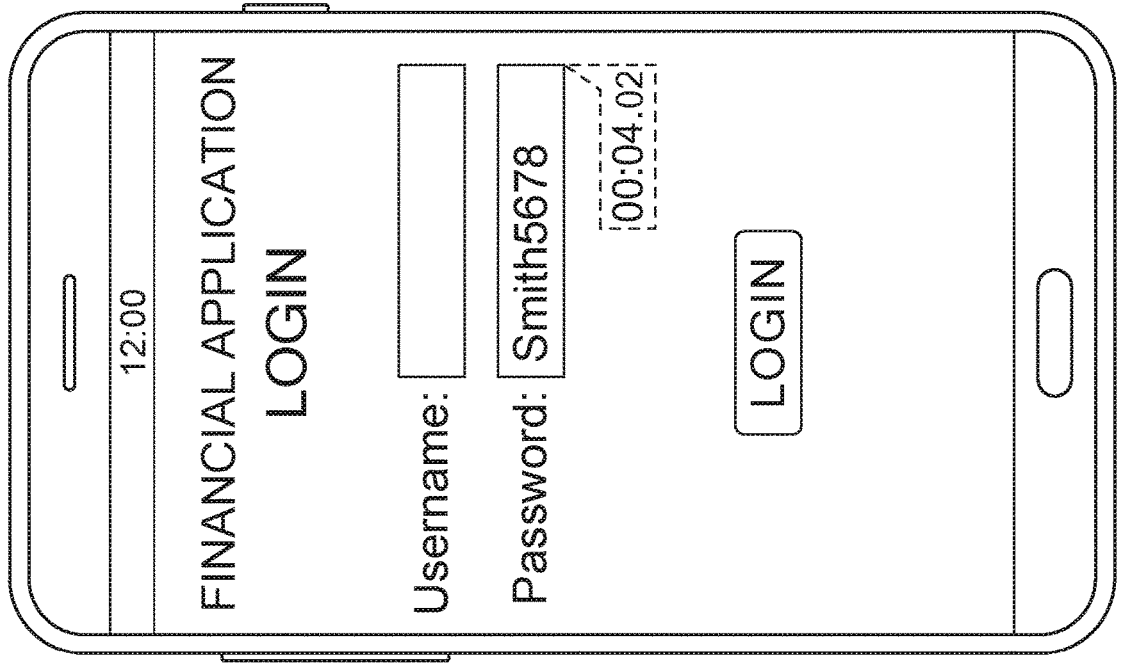
Figure 24:
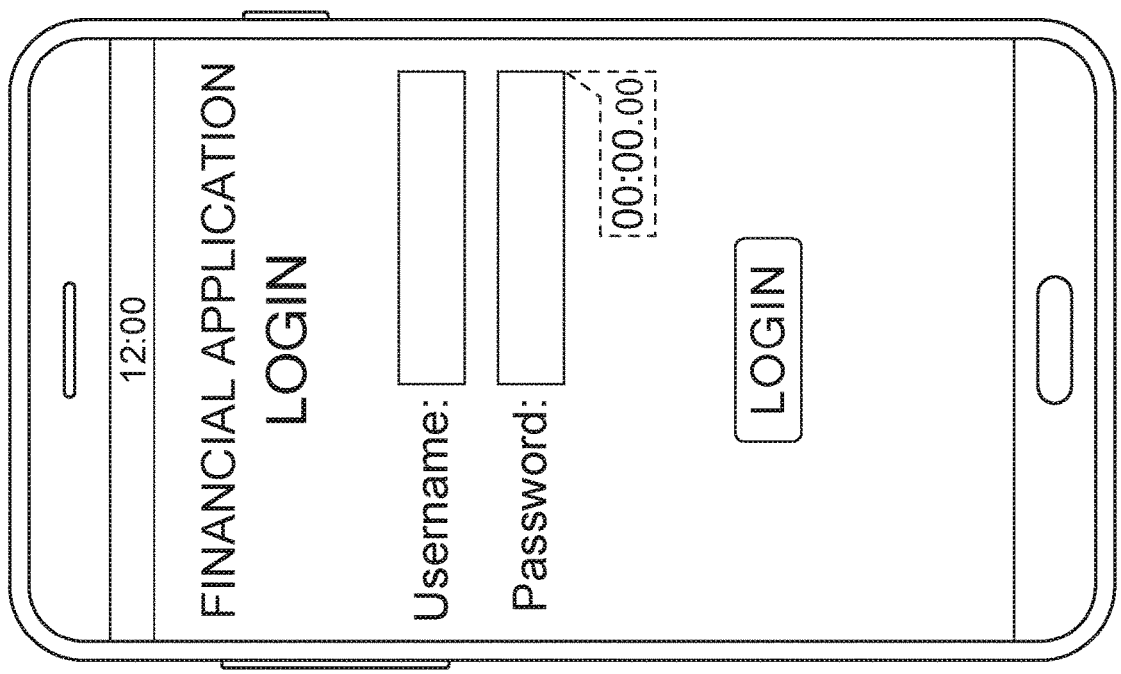

Another example of an input pattern may be shown by referencing FIGS. 11, 16, 22-26, and FIG. 21. FIGS. 11 and 16 show icons which may represent applications including a clock, calendar, notepad, files, and a financial application, which are displayed on display 265 of mobile computing device 100. Another example of an input pattern begins with FIG. 16, which shows that a user 110 has touched an icon corresponding to a financial application 253. Once the financial application 253 has been activated, the user interface may display on display 265 of the mobile computing device a login so that a user 110 can enter a username "John1234" and a password "Smith5678". More specifically, as shown in FIG. 22, an internal timer may begin after the financial application 253 is opened to track the amount of time the user 110 requires to enter a user name, which is displayed as 3.24 seconds in FIG. 23. As shown in FIG. 24, an internal time may begin after the financial application 253 is opened to track the amount of time that the user 110 requires to enter a password, which is 4.02 seconds as shown in FIG. 25. Other types of tracking may also occur. For example, the user may typically enter the password before entering the user name. The user may take longer to enter "John" than to enter "1234" or may take longer to enter one letter, number or symbol than another. The user may also take longer to enter certain groups of letters, numbers, and symbols than others. As discussed above, the financial application 253 may also prompt biometric entry as shown in FIG. 26 before the financial application 253 can access sensitive user data as shown in FIG. 21. As discussed above, a behavioral profile with respect to operation 425 may be performed by receiving, tracking, and storing in the memory of the mobile computing device 100 an input pattern (behavioral pattern) including navigation information and identification information inputted from the user during the user interaction with the mobile computing device 100. This input pattern may also be referred to as a sequence of events. As indicated in the above examples, how the identification information is input, when the identification information is input, and the order in which the identification information is input may all be a part of a behavioral profile of user 110. Moreover, the time, the day, and the number of times (frequency) a user 110 activates the financial application 253 may all form an input patter(s) which is/are received, tracked and stored to generate or maintain (update) a behavioral profile, so that anomalies in accessing the financial application 253 can be detected by machine learning. The local machine learning system including the local machine learning model is trained by one or more input patterns, so that the local machine learning system including the local machine learning model can detect abnormalities.

Figure 6:
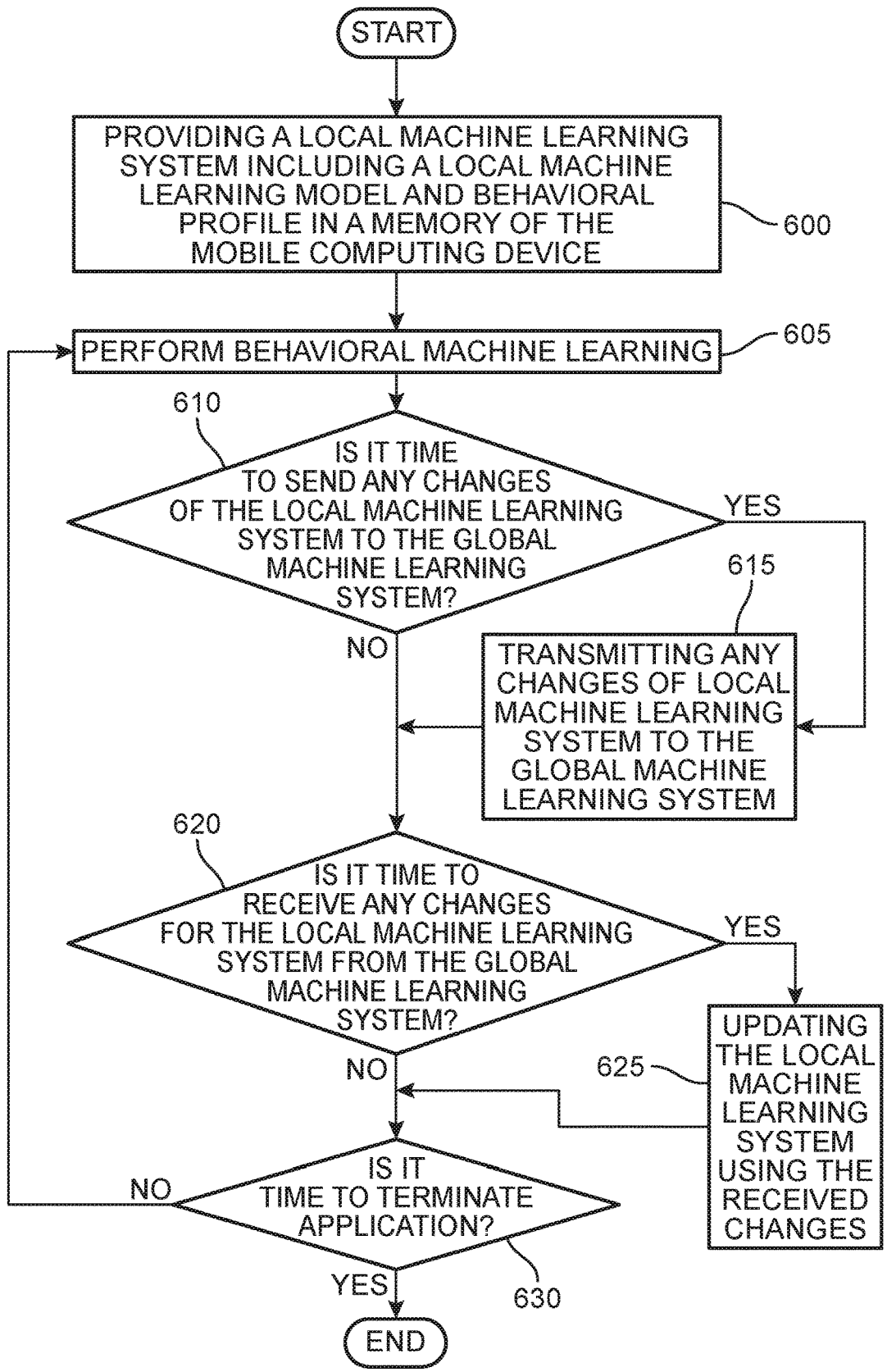
FIG. 6 is a flow chart illustrating a process for performing behavior machine learning according to an embodiment.

FIG. 6 is a flow chart illustrating a process for performing behavior machine learning according to an embodiment. In this example, a local machine learning system including a local machine learning model and behavioral profile of user 110 are stored in a memory 250 of mobile computing device 100. The local machine learning system including the local machine learning model and behavioral profile may be part of the financial application 253 or accessed by the financial application 253 (operation 600). The performance of behavioral machine learning in operation 605 is similar to the behavioral machine learning performed in operation 425, so that the local machine learning system including the local machine learning model continue to be updated and the behavioral profile continues to be updated.

The financial application 253 executed by the mobile computing device 100 may determine whether it is time to send any changes of the local machine learning system including the local machine learning model to the global machine learning system stored in the cloud computing system 210 (operation 610). As discussed above, the behavioral profile may be updated (maintained) through training (machine learning) by tracking and storing the behavior of the user 110 as the user interacts with the mobile computing device 100. Through this training, there may be changes to the local machine learning system including the local machine learning model due to changes in one or more of categories, labels, and weights. If it is time to send any changes from the local machine learning system to the global machine learning system, these changes are transmitted in operation 615 before moving to operation 620. If it is not the time to transmit any changes from the local machine learning system to the global machine learning system, then the process moves to operation 620.

Referring to operation 620, the financial application executed on the mobile computing device 100 may determine whether it is time to receive any changes of the local machine learning system including the local machine learning model from the global machine learning system, which also includes at least one global machine learning model (operation 620). If it is not the time for the local machine learning system to receive changes from the global machine learning system, then the process moves to operation 630. However, if it is time for the local machine learning system to receive any changes from the global machine learning system, then the mobile computing device 100 receives any changes from the global machine learning system (operation 625) and updates the local machine learning system including the local machine learning model at the direction of the financial application 253 (operation 625).

Figure 7:
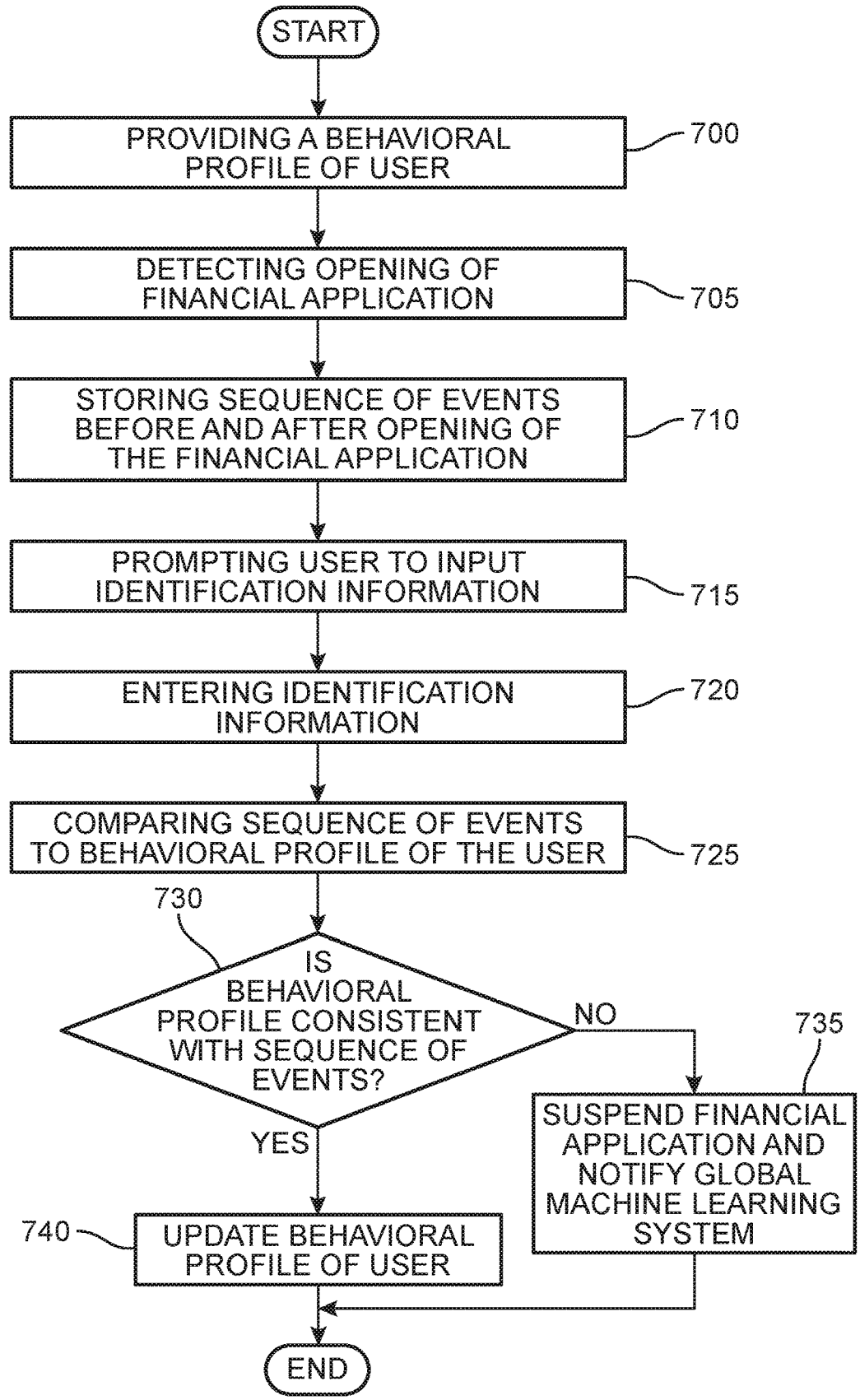
FIG. 7 is a flow chart for utilizing machine learning to detect anomaly according to an embodiment.

FIG. 7 is a flow chart for utilizing machine learning to detect anomaly according to an embodiment. As indicated in this example, a behavioral profile is provided and stored in memory 250 of the mobile computing device 100 (operation 700), and the financial application 253 detects the opening of the financial application 253 (operation 705). A sequence of events before and after the opening of a financial application may be stored in the memory 250 of the mobile computing device 100 (operation 710) and a user may be prompted to input identification information (operation 715). The user 110 enters the identification information (operation 720). Operations 710, 715, and 720 are all a sequence of events which are stored by the mobile computing device 100, so that that this sequence of events providing an input pattern (behavioral pattern) may be compared to a behavioral profile of a user 110, which is stored in memory 250 (operation 725). The local machine learning system including the local machine learning system performs the comparison in operation 730. If the behavioral profile is generally consistent with a sequence of events in operations 710, 715, and 720, then no anomaly is detected and the behavioral profile of the user may be updated in operation 740. However, if an anomaly is detected due to a substantial difference between the stored behavioral profile of the user 110 and the sequence of events, the financial application 253 will suspend the operation of the financial application to deny the user access to the sensitive data and notify the global machine learning system (operation 735).

Figure 8:
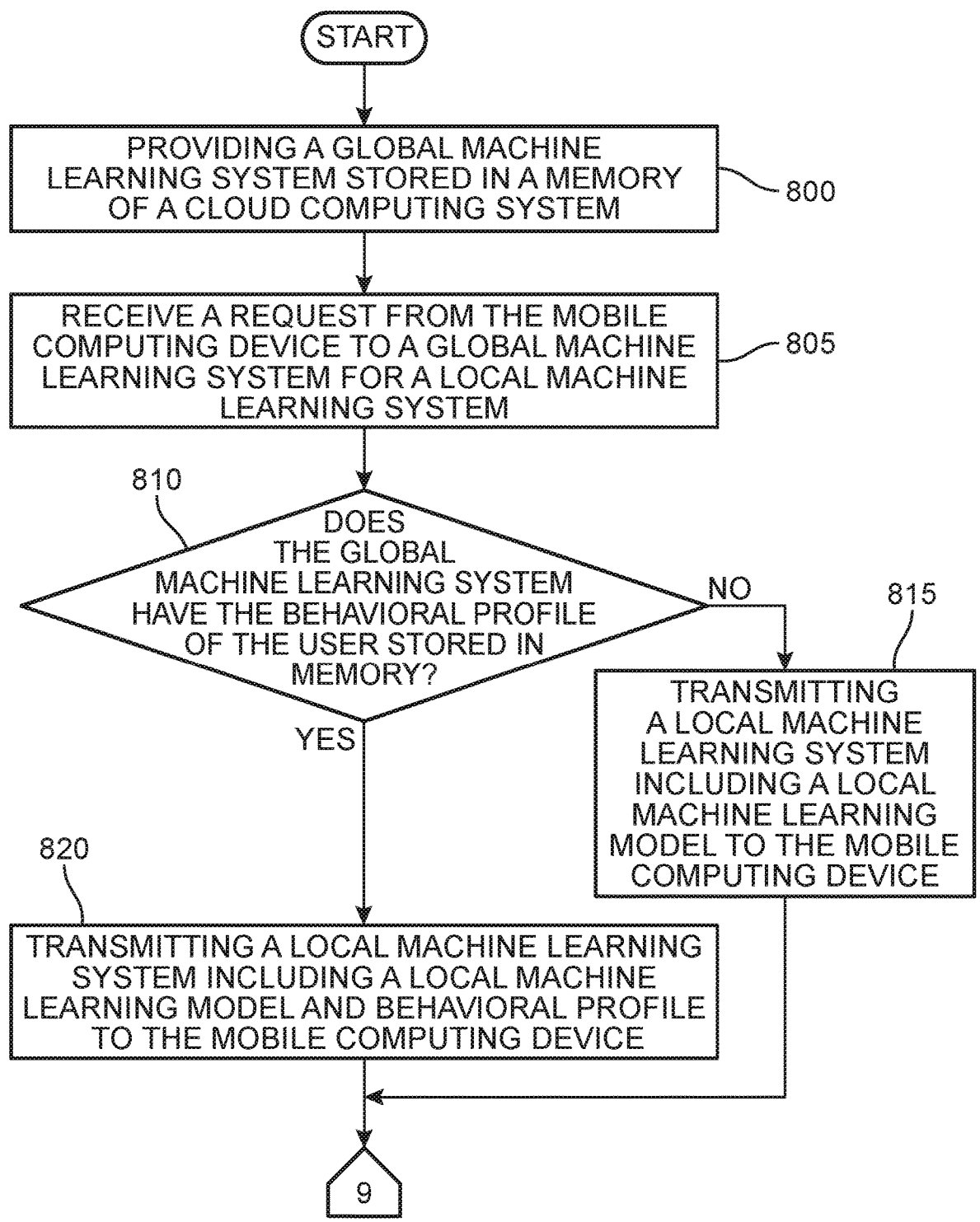
FIGS. 8 and 9 are flow charts illustrating a process for updating machine learning systems according to an embodiment.
Figure 9:
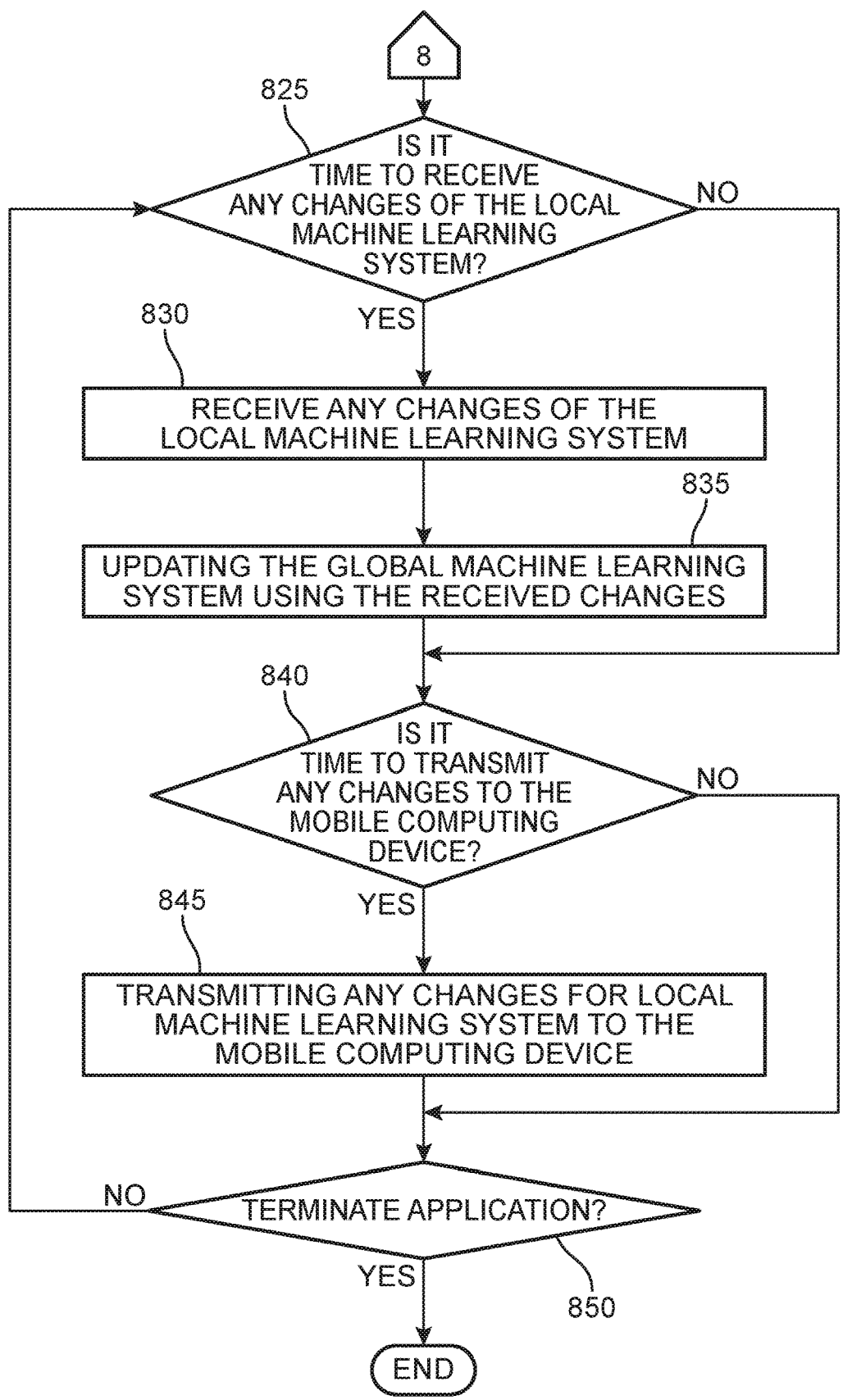

FIGS. 8 and 9 are flow charts illustrating a process for updating machine learning systems according to an embodiment. A global machine learning system is stored in a cloud computing system 210 (operation 800). The global machine learning system may receive a request from the mobile computing device 100 for a local machine learning system (operation 805). In operation 810, the global machine learning system determines whether a behavioral profile of a user 110 making the request through the mobile computing device 100 is stored in the memory 220 of the cloud computing system 210 (operation 810). If the behavioral profile is not stored in memory, then the local machine leaning system including a local machine learning model may be transmitted to the mobile computing device 100 (operations 810 and 815). If the behavioral profile is stored in memory 220, then the local machine learning system including a local machine learning model and a behavioral profile of the user 110 are transmitted to the mobile computing device 100 (operations 810 and 820).

Referring to FIG. 9, the process determines whether it is time to receive any changes of the local machine learning system (operation 825). If it is not time, then the process moves to operation 840. If the process determines that it is time to receive changes of the local machine learning system (operation 825), then the global machine learning system receives any changes of the local machine learning system (operation 830) and updates the global machine learning system using the received changes (835) before proceeding to operation 840. As discussed above, these changes to the local machine learning system including the local machine learning model may include one or more of categories, labels, and weights. In addition, any changes impacting any behavioral profile stored in memory may also be included.

Referring to FIG. 9, the process determines whether it is time to transmit any changes to the local machine learning model to the mobile computing device 100 from the global machine learning system. As discussed above, these changes to the local machine learning system including the local machine learning model may include one or more of categories, labels, and weights. If it is time to transmit any changes of the local machine learning system to the mobile computing device 100 so that the mobile computing device may update the local machine learning system stored in memory 250, then these changes are transmitted from the global machine learning system to the mobile computing device (operations 840 and 845). If it is not time to transmit these changes or any changes have been transmitted, the process moves to operation 850. If the financial application 253 on the mobile computing device terminates, the process terminates (operation 850). For example, the communication between the mobile computing device 100 and the cloud computing system may have been terminated by user 110 by closing the financial application 253. If the process has not terminated, then the process may proceed to operation 825, which is discussed above.

Figure 10:
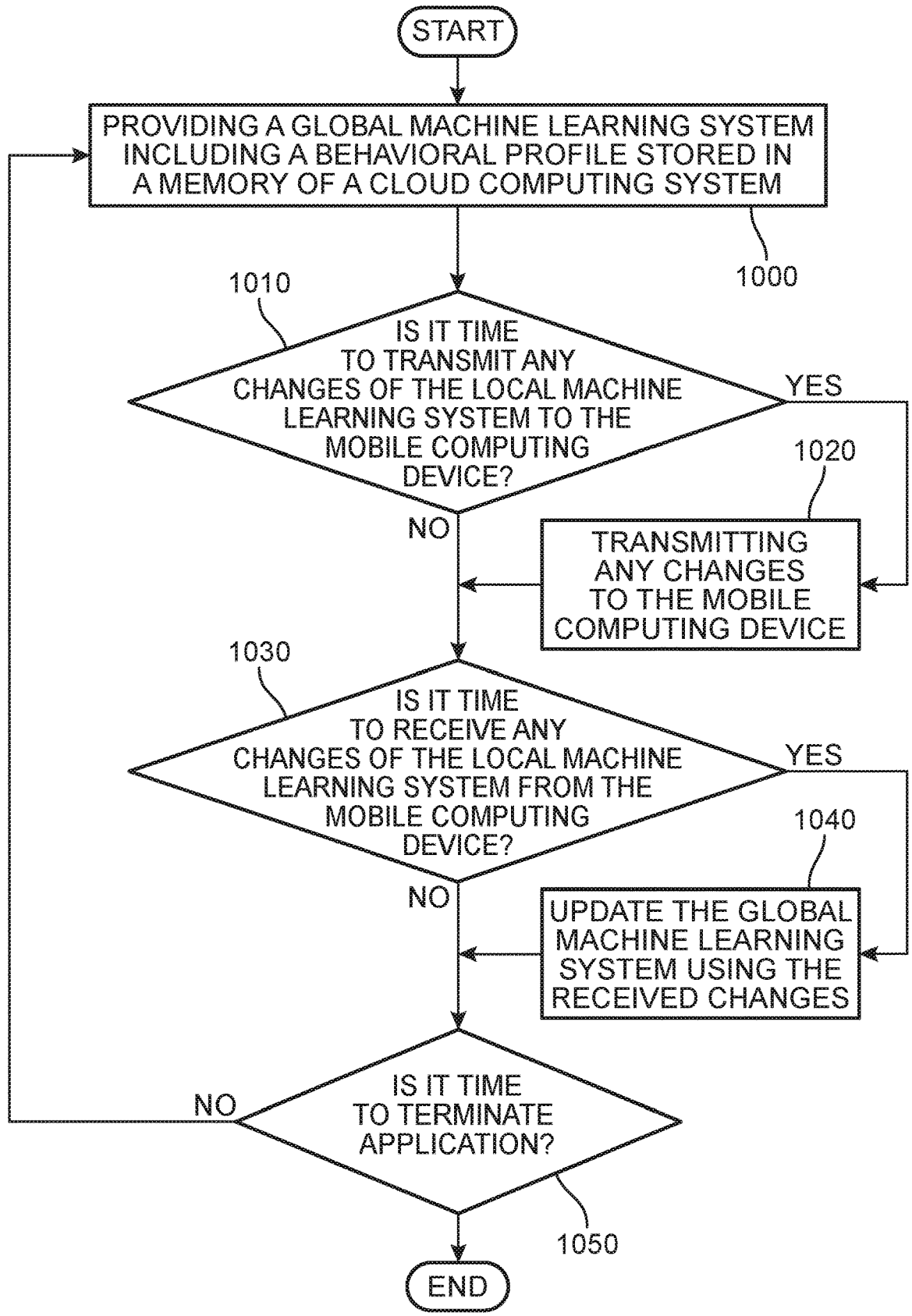
FIG. 10 is a flow chart illustrating a process for updating machine learning systems according to an embodiment.

FIG. 10 is a flow chart illustrating a process for updating machine learning systems according to an embodiment. A global machine learning system including a behavioral profile may be stored in a memory 220 of a cloud computing system 210 (operation 1000). In this example, a behavioral profile of a user 110 is not yet stored in the memory 220 of the cloud computing system 210. In this example, the process determines whether it is time to transmit any changes of the local machine learning system to the mobile computing device 100 (operation 1010). If it is not time, then the process moves to operation 1030). If the process determines that it is time to transmit changes of the local machine learning system to the mobile computing device (operation 1010), then the global machine learning system transmits any changes of the local machine learning system (operation 1020) so that the mobile computing device 100 may update the local machine learning system using the transmitted changes before proceeding to operation 1030. As discussed above, these changes to the local machine learning system including the local machine learning model may include one or more of categories, labels, and weights. In addition, any changes impacting any behavioral profile stored in memory may also be included Referring to operation 1030, the process determines whether it is time to receive any changes of the local machine learning system from the mobile computing device 100 (operation 1030). If it is not time, then the process moves to operation 1050. If the process determines that it is time to receive changes of the local machine learning system from the mobile computing device 100 (operation 1040), then the global machine learning system receives any changes of the local machine learning system (operation 1040) and updates the global machine learning system using the received changes before proceeding to operation 1050. As discussed above, these changes to the local machine learning system including the local machine learning model may include one or more of categories, labels, and weights. If the financial application 253 on the mobile computing device terminates, the process terminates (operation 1050). For example, the communication between the mobile computing device 100 and the cloud computing system may have been terminated by user 110 by closing the financial application 253. If the process has not terminated, then the process may proceed to operation 1000, which is discussed above.

It may be appreciated that the above systems and methods may apply not only to applications associated with financial institutions in the field of insurance but to any other fields pertaining to the use of anomaly detection in user behavior to provide improved security.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for performing machine learning in a computing device for a detection of an anomaly in an interaction with the computing device, the method comprising:
    detecting, on the computing device, an opening of a financial institution application;
    transmitting, by the computing device, a request to a cloud computing system after the opening of the financial institution application;
    receiving, by the computing device, one of a machine learning model or a change to the machine learning model updating the machine learning model from the cloud computing system in response to the request;
    including the machine learning model as part of the financial institution application;
    storing, in a memory of the computing device, a behavioral profile of a user of the computing device generated by the machine learning model of the financial institution application;
    receiving, by the machine learning model, an input pattern including navigation information and identification information inputted during the interaction with the financial institution application running on the computing device, wherein the identification information includes a user name and a password;
    tracking, by the machine learning model, the input pattern including the navigation information and the identification information inputted during the interaction with the financial institution application running on the computing device and the tracking of the input pattern further comprises:
        starting an internal timer upon the opening of the financial institution application;
        tracking a first amount of time to enter the user name; and
        tracking a second amount of time to enter the password;
    storing, by the machine learning model, in the memory of the computing device the input pattern including the navigation information and the identification information inputted during the interaction with the financial institution application running on the computing device;
    verifying the identification information;
    detecting, by machine learning model, an anomaly of the input pattern by comparing the behavioral profile with the input pattern, wherein detecting the anomaly of the input pattern by comparing the behavioral profile with the input pattern includes comparing the behavioral profile to the first amount of time and the second amount of time; and
    prohibiting further access to the financial institution application including a user account in response to the anomaly.

2. The method of claim 1, wherein detecting the anomaly includes detecting that an unauthorized user is interacting with the computing device.

3. The method of claim 1, wherein receiving the input pattern includes receiving a biometric marker and detecting the anomaly includes detecting a health problem from the biometric marker.

4. The method of claim 1, further comprising utilizing, by the machine learning model, the input pattern as training data to update one or more of a weight, a category and a label in the machine learning model to update the behavioral profile.

5. The method of claim 1, wherein the identification information includes one or more of biometric identification information, a username, a password, and a security key.

6. The method of claim 1, further comprising:
    utilizing, by the machine learning model, the input pattern as training data to determine an update one or more of a weight, a category and a label in the machine learning model;
    transmitting the update to the machine learning model to the cloud computing system, which stores the behavioral profile of the user; and
    updating the behavioral profile stored in a memory of the cloud computing system based on the update to the machine learning model.

7. The method of claim 1, wherein the computing device is one of a smartphone, a tablet, a smartwatch, a smart glass, a smart helmet, or a laptop.

8. The method of claim 1, wherein the cloud computing system stores the machine learning model and the behavioral profile of the user of the computing device for transmission to another computing device operated by the user and running a copy of the financial institution application.

9. The method of claim 1, further comprising:
    determining, prior to receiving the machine learning model from the cloud computing system, that the behavioral profile is stored by in a memory of the cloud computing system; and
    receiving, by the computing device, the behavioral profile from the cloud computing system.

10. A method for detecting an anomaly based on interactions with a mobile computing device through machine learning, the method comprising:
storing a financial application in a memory of the mobile computing device;
detecting an activation, on the mobile computing device, of the financial application;
transmitting, by the mobile computing device, a request to a cloud computing system after the activation of the financial application;
receiving, by the mobile computing device, a response to the request including a change to the machine learning model updating the machine learning model and a behavioral profile generated by the machine learning model from the cloud computing system;
storing, by the mobile computing device, the machine learning model and the behavioral profile generated by the machine learning model in the memory of the mobile computing device;
including the machine learning model as part of the financial application;
receiving, by the mobile computing device, an input pattern including navigation information and identification information inputted during the interaction with the financial application running on the mobile computing device, wherein the identification information includes a user name and a password;
tracking, by the mobile computing device, the input pattern including the navigation information and the identification information inputted during the interaction with the financial application running on the computing device and the tracking of the input pattern further comprises:
starting an internal timer upon the activation of the financial application;
tracking a first amount of time to enter the user name; and
tracking a second amount of time to enter the password;
storing, by the mobile computing device, the input pattern including the navigation information and the identification information inputted during the interaction with the financial application running on the computing device;
verifying the identification information;
detecting, by machine learning model, an anomaly based on the input pattern by comparing the behavioral profile with the input pattern, wherein detecting the anomaly of the input pattern by comparing the behavioral profile with the input pattern includes comparing the behavioral profile to the first amount of time and the second amount of time; and
prohibiting further access to the financial application including a user account in response to the anomaly.

11. The method of claim 10, wherein detecting the anomaly includes detecting that an unauthorized user is interacting with the mobile computing device.

12. The method of claim 10, wherein receiving the input pattern includes receiving a biometric marker and detecting the anomaly includes detecting a health problem from the biometric marker.

13. The method of claim 10, further comprising utilizing, by the machine learning model, the input pattern as training data to update one or more of a weight, a category and a label in the machine learning model to update the behavioral profile.

14. The method of claim 10, wherein the identification information includes one or more of biometric identification information, a username, a password, and a security key.

15. The method of claim 10, further comprising;
utilizing, by the machine learning model, the input pattern as training data to determine an update one or more of a weight, a category and a label in the machine learning model;
transmitting the update to the machine learning model to the cloud computing system, which stores the behavioral profile of the user; and
updating the behavioral profile stored in the memory of the cloud computing system based on the update to the machine learning model.

16. The method of claim 10, wherein the mobile computing device is one of a smartphone, a tablet, a smartwatch, a smart glass, a smart helmet, or a laptop.

17. The method of claim 10, further comprising determining, prior to receiving the machine learning model and the behavioral profile generated by the machine learning model from the cloud computing system, that the behavioral profile is stored by in the memory of the cloud computing system.

18. A system for detecting an anomaly based on an interaction with a mobile computing device through machine learning comprising at least one memory including instructions and at least one hardware processor to execute the instructions within the at least one memory to implement:
receiving, by the mobile computing device, a machine learning model and a behavioral profile of a user generated by the machine learning model from a cloud computing system;
including the machine learning model as part of a financial institution application;
storing the behavioral profile of the user of the mobile computing device in the at least one memory of the mobile computing device; and
detecting an activation, on the mobile computing device, of the financial institution application which includes the machine learning model which is configured to:
receive, track, and store in the at least one memory an input pattern including navigation information and identification information inputted during the interaction with the financial institution application running on the mobile computing device, wherein the identification information includes a user name and a password and the machine learning model configured to track the input pattern further comprises machine learning model configured to:
start an internal timer upon the activation of the financial institution application;
track a first amount of time to enter the user name; and
track a second amount of time to enter the password;
verify the identification information;
detect, by machine learning model, an anomaly of the input pattern by comparing the behavioral profile with the input pattern, wherein the machine learning model configured to detect the anomaly of the input pattern by comparing the behavioral profile with the input pattern includes machine learning model configured to compare the behavioral profile to the first amount of time and the second amount of time; and
prohibit further access to the financial institution application including a user account in response to the anomaly.

19. The system of claim 18, wherein the anomaly indicates an unauthorized user is interacting with the financial institution application running on the mobile computing device.

20. The system of claim 18, wherein receiving the input pattern includes receiving a biometric marker and detecting the anomaly includes detecting a health problem from the biometric marker.

\* \* \* \* \*